United States Patent [19]

Vincent

[11] Patent Number: 5,272,518
[45] Date of Patent: Dec. 21, 1993

[54] COLORIMETER AND CALIBRATION SYSTEM

[75] Inventor: Kent D. Vincent, Cupertino, Calif.

[73] Assignee: Hewlett-Packard Company, Palo Alto, Calif.

[21] Appl. No.: 629,862

[22] Filed: Dec. 17, 1990

[51] Int. Cl.⁵ .................................. G01N 21/25
[52] U.S. Cl. ............................. 356/405; 356/416; 356/419; 356/223; 358/10; 250/226
[58] Field of Search .......... 356/405, 406, 407, 408, 356/414, 416, 417, 418, 419, 223; 250/226; 358/10, 75, 80

[56] References Cited

U.S. PATENT DOCUMENTS

| | | | |
|---|---|---|---|
| 2,960,015 | 11/1960 | Rodine | 95/1 |
| 3,442,572 | 5/1969 | Illsley et al. | 350/166 |
| 3,490,849 | 1/1970 | Hambleton | 356/176 |
| 3,498,693 | 3/1970 | Fein et al. | 350/160 |
| 3,525,572 | 8/1970 | Hunter et al. | 356/176 |
| 3,552,826 | 1/1971 | Hanes et al. | 350/166 |
| 3,880,523 | 4/1975 | Thomas | 356/79 |
| 3,929,398 | 12/1975 | Bates | 356/186 |
| 4,054,389 | 10/1977 | Owen | 356/189 |
| 4,150,898 | 4/1979 | Suga | 561/405 |
| 4,402,611 | 9/1983 | Yuasa | 356/405 |
| 4,500,919 | 2/1985 | Schreiber | 358/78 |
| 4,547,074 | 10/1985 | Hinoda et al. | 356/405 |
| 4,685,808 | 8/1987 | Nakazawa et al. | 356/419 |
| 4,717,954 | 1/1988 | Fujita et al. | 356/402 |
| 4,743,114 | 5/1988 | Crane, Jr. | 356/346 |
| 4,746,970 | 5/1988 | Hosokawa | 358/10 |
| 4,822,998 | 4/1989 | Yokota et al. | 250/226 |
| 4,838,697 | 6/1989 | Kurandt | 356/406 |
| 4,886,366 | 12/1989 | Kogure | 356/406 |
| 4,902,136 | 2/1990 | Mueller et al. | 356/419 |
| 4,909,633 | 3/1990 | Okui et al. | 356/405 |
| 4,917,495 | 4/1990 | Steenhoek | 356/328 |
| 4,989,982 | 2/1991 | Osaki et al. | 356/419 |

FOREIGN PATENT DOCUMENTS

PCT/US88/-
03898 6/1989 PCT Int'l Appl. .

OTHER PUBLICATIONS

G. Wyszocki and W. S. Stiles, *Color Science*, John Wylie and Sons, 1982, Chapters 3, 4 and 5.
H. A. McLeod, *Thin Film Color Filters*, Macmillan, 1986, pp. 71-136 and pp. 270-276.
M. Born and E. Wolf, *Principles of Optics*, Pergamon Press, Fifth Ed., 1975, pp. 323-329.
L. R. Masten, *Understanding Optronics*, Texas Instruments Learning Center, 1981, Chaps. 3, 4, 7.
S. Morozumi et al., "Completely Integrated a-Si:H Linear Image Sensor with Poly Si T.F.T. Drivers", Extended Abstracts of the 16th (1984 International) Conference on Solid State Devices and Materials, Kobe, 1984, pp. 559-562.

*Primary Examiner*—Vincent P. McGraw
*Assistant Examiner*—LaCharles P. Keesee

[57] ABSTRACT

Apparatus for monitoring, converting and calibrating the spectra displayed by a colored object, using wavelength dispersion provided by a variable wavelength filter. The apparatus may serve as a spectrophotometer, as a colorimeter, or as a spectroradiometer or other device that monitors and calibrates a light signal by decomposition of the signal into a wavelength distribution. The apparatus may also be used as part of a feedback network to monitor and correct colors displayed by a color monitor, color printer, color scanner or other similar peripheral device controlled by a computer that is part of the network.

28 Claims, 15 Drawing Sheets

COLORIMETER AND CALIBRATION SYSTEM

TECHNICAL FIELD

This invention relates to color calibration devices for self-luminous and non-self-luminous objects.

BACKGROUND ART

A spectrophotometer is usually the most accurate and versatile of the devices used for measuring or monitoring color of an object based upon a dispersion of light emitted or reflected from the object and dispersed into a plurality of separate wavelengths. A colorimeter belongs to a subclass of spectrophotometers that is concerned primarily or solely with the strengths of the different wavelengths when compared with a CIE standard for color such as 1931 CIE XYZ. Standard colorimetry determines tristimulus values received by a color discrimination module with reference to certain standard values such as the widely accepted 1931 CIE XYZ standards. Colorimetry may be used to assess the colors produced on a video screen, in paints, at solid surfaces such as paper and plastics, as transmitted by or reflected from liquids, in dyed fabrics and textiles, in natural materials such as leather and wool, and as produced by computer peripheral devices such as color monitors, color printers and color scanners. Ideally, a colorimeter will perform accurate color measurements for any self-luminous body and for any light issued from a body illuminated by a separate light source.

The invention disclosed herein is applicable to spectrophotometers generally and more particularly to colorimeters. For convenient reference, the apparatus disclosed herein will be referred to as a colorimeter, without intending to limit the scope of application of the apparatus.

Hambleton, in U.S. Pat. No. 3,490,849, discloses a colorimeter in which light from a sample is diffused in a sphere and passed through a filter to a photomultiplier tube. A plurality of filters must be inserted, one at a time, in order to adequately cover the spectral range of interest.

U.S. Pat. No. 3,525,572, issued to Hunter et al., discloses reflection of light from the surface of a fabric or similar light-reflecting object, and passage of this light to a sequence of photomultiplier tubes covered with tristimulus color filters. The tube signals are passed through certain circuits for analysis and determination of the color of the light received by the tubes. Two or more light sources may be used to separately illuminate the sample for purposes of color determination.

U.S. Pat. No. 3,880,523, issued to Thomas, discloses a multi-channel colorimeter in which a diffraction grating is used to decompose an incoming light beam into a plurality of non-overlapping spectral bands, with each such band being directed along a separate light waveguide for use in colorimetry.

Suga discloses use of three filter mirrors, each corresponding to a different color, as part of a colorimeter in U.S. Pat. No. 4,150,898. Light produced by the sample is separately reflected from each filter mirror and is received as a first light component by a phototube, which also receives a second light component directly from a light source used to illuminate the sample. The first and second light components are compared to determine the composition of light from the sample that is reflected by the particular filter mirror. Three or more filter mirrors are used, and each filter must be positioned separately to reflect light to the phototube. Simultaneous filtering at all wavelengths of light from the sample is not available.

A trichromatic colorimeter for obtaining CIE chromaticity coordinates, disclosed by Yuasa in U.S. Pat. No. 4,402,611, separates a light beam into three components and passes each beam component through a separate color filter corresponding to one of the tristimulus spectra. The three filtered light beams are then passed to separate photosensor arrays to produce electronic output signals that may be analyzed to determine the spectrum of the incoming light beam.

Kurandt, in U.S. Pat. No. 4,838,697, discloses use of two or three dichroic mirrors that receive light and filter it in different portions of the visible spectrum. The filtered light is then analyzed colorimetrically.

Steenhoek, in U.S. Pat. No. 4,917,495, discloses use of 12 photodetector elements that decompose an incoming light beam into separate spectral bands, for subsequent color analysis by computation of the tristimulus integrals for the incoming light beam.

In using a spectrophotometer, it is usually necessary to disperse the incident light beam into a plurality of different wavelengths or wavelength intervals in order to fully analyze the content of the incident light beam. Wavelength dispersion, using a plurality of beamsplitters, each functioning in a different part of the wavelength spectrum, is disclosed by Perkins in U.S. Pat. No. 4,681,445.

Crane, in U.S. Pat. No. 4,743,114, discloses the use of Fabry-Perot interferometer scanning using a nutating etalon in which the incidence angle of the light beam relative to the interferometer is caused to vary periodically in two perpendicular directions of rotation.

Use of a blazed diffraction grating or similar means of wavelength dispersion is disclosed in U.S. Pat. No. 4,758,090, issued to Schuma, in U.S. Pat. No. 4,718,764, issued to Fink, and in U.S. Pat. No. 4,776,696, issued to Hettrick et al.

Rodine, in U.S. Pat. No. 2,960,015, discloses a method of making variable transmission light filters in a two-dimensional, radially symmetric configuration in which filter transmissivity varies with radial distance from the center of a circular pattern.

A variable color filter is disclosed by Illsley et al. in U.S. Pat. No. 3,442,572, using a wavelength filter positioned on the circumference of a large circle, where the filter thickness increases linearly with increase of the azimuthal angle $\theta(0 \leq 8\theta < 2\pi)$ of the position on the circle circumference. This method relies on a fabrication method and apparatus, disclosed and claimed in two division patents, U.S. Pat. Nos. 3,530,824 and 3,617,331, but probably cannot be used to fabricate a filter whose thickness is not linearly increasing with increase in a spatial coordinate.

Fein et al. disclose an optical radiation translating device in U.S. Pat. No. 3,498,693. The Fein et al. apparatus in one embodiment (FIG. 3) uses two spaced apart planar reflectors of light that are inclined at a non-zero angle relative to one another, with a wedge-shaped dielectric material occupying the volume between the two reflectors. Light is transmitted through the wedge-shaped filter, requiring constructive interference of the light waves, only at positions along the device where the one way optical path length of the light beam through the dielectric material is an integral multiple of one half of the wavelength $\lambda_0$ of the light. The light is assumed to be monochromatic.

In U.S. Pat. No. 3,552,826, Hanes et al. disclose a variable thickness, multi-layer light reflector with a thickness h(x) that decreases exponentially with increase in a spatial coordinate x, measured in a predetermined direction in a plane of the reflector. The reflectance R of the reflector at any point x is a function of the single variable $w = \lambda/h(x)$, where $\lambda$ is the wavelength of light incident on the reflector. The exponential decrease of thickness h(x) with the coordinate x is required in order to ensure that $\delta^2 R/\delta\lambda\delta x = 0$ and $\delta^2 R/\delta x^2 = 0$.

Bates, in U.S. Pat. No. 3,929,398, also discloses use of a wedge-shaped interference filter to produce a line of light at a particular coordinate position x that varies with the wavelength of the incident monochromatic light. The position x of the line of light is variable and is controlled by the operator's choice of wavelength of the incident light. A sequence of masks is used to selectively mask portions of the line to produce an ordered sequence of dark and light regions on the illuminated line that characterizes the light (e.g., each wavelength).

A color sensing device using a group of adjacent, non-overlapping light filters with different pass bands is disclosed by Hinoda et al. in U.S. Pat. No. 4,547,074. Each light filter consists of an interference filter with a plurality of separated wavelength pass bands plus a color filter with a sharp cutoff band that falls within one of the interference filter pass bands. The serial combination of these two filters selects a particular, fixed narrow wavelength band for transmission of light therethrough. A photodiode, positioned beneath the serially combined interference filter and color filter, receives the transmitted light and determines the relative intensities of light in each of several wavelength pass bands. Photodiode light-receiving faces may have different areas to reflect the light sensitivity of the photodiodes in different, fixed wavelength regions. A subgroup of such filters may be configured to sense the relative amount of light in each of a set of adjacent wavelength bands, to thereby produce color matching capability according to the CIE XYZ colorimetric system. The incident light is not assumed to be monochromatic, but it appears that each interference filter/color filter pair must be carefully matched to provide a fixed wavelength pass band.

Owen, in U.S. Pat. No. 4,054,389, discloses a spectrophotometer in which light is first collected by a bundle of optical fibers, each of which delivers light to a separate position on a light-receiving surface. The light-receiving surface may be a first surface of a wedge-shaped linear variable interference filter that has a second opposing surface at which an array of photosensors is positioned to receive the light passed through various sections of the interference filter. Each photosensor responds to light of a different wavelength delivered by one of the optical fibers.

U.S. Pat. No. 4,822,998, issued to Yokota et al., discloses use of an array of light sensors, each sensor being sensitive to a different wavelength range in receiving light transmitted through a light filter with a transmission wavelength band pass corresponding to the wavelength band to which the light sensor responds. In one embodiment, shown in FIG. 1 of the Yokota et al. patent, the light filter array is arranged in a double staircase configuration, with the filter thickness increasing from one plateau of constant thickness to another plateau of greater constant thickness. A first filter staircase and second filter staircase have filter thicknesses chosen to correspond to optical interference orders m = 1 and m = 2, respectively, according to well known optical relations for a Fabry-Perot etalon. By separating the visible spectrum (wavelengths $\lambda = 0.4-0.7$ $\mu$m) into two smaller wavelength ranges, the sidebands of each interference order, other than the order m = 1 or m = 2 that is desired, are caused to appear at wavelengths well removed from the visible spectrum and can be attenuated with simple fixed band pass ultraviolet and/or infrared filters. Low order Fabry-Perot interference bands are usually not narrow enough by themselves for most spectrophotometer applications. As FIG. 7 of the Yokota patent illustrates, the full width at half maximum ("FWHM") for a low order interference band, with a central wavelength $\lambda_c = 400$ nm, is 15 nm and 9.6 nm for surface reflectivities of R = 0.23 and 0.62, respectively. The FWHM will increase with increase in wavelength. These FWHM values are much too wide for many applications of such technology in colorimeters and radiometers. Increasing the reflectivity R of the surfaces of the Fabry-Perot etalon will narrow the FWHM by a modest amount, but the FWHM is still too large for some spectrophotometer applications, and the transmissivity T = 1-R may already be so low that the signal-noise ratio for the photosensor signals becomes a concern The wavelength skirts that extend beyond the FWHM wavelength region may also be too broad to allow sharp wavelength discrimination.

A wedge-shaped filter spectrometer is disclosed by Pellicori et al in the patent application PCT/US88/03898, published circa 15 June 1989. The Pellicori et al. spectrometer provides a sequence of wedgeshaped order-wavelength thickness dielectric layers of alternating refractive indices high (H), low (L), high (H), low (L), . . . that are deposited on one another in accordance with a sequence H LL HLHLHL HH LHLHLH LL HL. The thickness of each of these layers has a constant slope as a spatial position coordinate x changes in a selected direction across the face of the filter Pellicori et al. note that undesirable sidebands, appearing at wavelengths removed from a central wavelength $\lambda_c$, are present and suggest the use of an interference filter blocking stack, with an apparently fixed pass band, to prevent the appearance of the side bands in the transmitted light beam.

Monitor-specific calibrators are available which measure the brightness of a portion of a CRT screen under specific conditions. The sensor is usually a single silicon photodiode, and each CRT gun is turned on individually (e.g., red, then green, then blue) over a sequence of successively greater brightnesses to determine the gamma, offset and gain parameters for that color and that device. This information is fed into an associated computer to correct the CRT amplifiers in order to correct any errors present. The phosphor set used with the color monitor must be known exactly so that such a device is not universally applicable to CRTs of other manufacturers or even other products of the same manufacturer. In particular, the monitor-specific color calibrator is not useful for color printers, for general color calibration, or for use of ambient lighting rather than the specific lighting for which the color calibrator is set. Examples of such devices are light calibrators offered by Barco Industries for their color monitors, and by Radius, Inc. for the Apple Macintosh color monitors. These devices function as calibration probes that are electronically tethered to a host computer.

An example of a tristimulus colorimeter and calibration system is shown in U.S. Pat. No. 4,500,919, issued to Schreiber. This patent discloses use of a color scanner as a calibration device to produce a set of three tristimulus signals dependent on the colors sensed in the original document. The scanner measures red, green and blue components as usual and is used to calibrate the colors of print samples. The RGB signals are not colorimetrically correct, unless matched with the eye for specified lighting conditions, the scanner produces color errors. Here, a color scanner is used as a tristimulus color input device without comparison to the basic XYZ color standards. A scanner would be unable to determine the color transfer function of a color monitor, as required for a general purpose colorimeter.

Many of the devices of the prior art are large and bulky and do not make full use of or analyze all wavelengths in a continuous wavelength interval of the incident light beam. The cost of these devices is usually great, due in part to the delicate optical systems used. Further, no controllable means has been disclosed for compensating, at the same time, for the non-uniform sensitivity, as a function of wavelength, of photodetector elements or for compensating for use of a non-standard light source for illumination of an object whose color is to be measured or monitored. Finally, the devices in the prior art compensate for the presence of undesirable bands, if at all, only through use of a fixed pass band filter that is used in combination with the wavelength dispersion means.

Several other technology-based problems recur, including the problems that: (1) color errors arise because the filters cannot provide a perfect match of the XYZ tristimulus response of the human eye; (2) use of a set of fixed filters is applicable only to a fixed ambient lighting condition, with no flexibility in use of other available light sources; and (3) the XYZ tristimulus values sensed by the colorimeter must be read and manually entered into a computer for further computations.

Each peripheral device, such as a color monitor, color printer or color scanner, produces colors using intrinsically different colorants, such as phosphors used in monitors, color dyes and pigments used in printers used, and filters used in color scanners. The rendition of colors, given the same color input signals, thus varies with the device (device dependence). Some workers have attempted to electronically correct for intrinsic wavelength-dependent differences, such as lower sensitivity of photosensors at the blue end of the visible spectrum vis-a-vis the red end of the spectrum. However, color errors still persist because the color transfer functions of these devices are not entirely stable: amplifier drift occurs in a color monitor; printer colors change with the paper or substrate upon which the printing occurs; and color scanners also have drift problems. Further, the manufacturer cannot predict the ambient lighting conditions under which the computer system will operate. The net result is that the rendered images of the peripheral device may vary with time and may be incorrect over all. Data sent from one computer to another may not provide matching colors between the two systems.

A need also exists for a means to add "real" colors to CAD rendering software. The computer industry has gone to great lengths to add realism to CAD rendering programs such as ray tracing algorithms. To date, this greater realism has been realized only through the use of synthetic color palettes with computer-generated colors. It would be more appropriate to be able to input the color values of a real object that the CAD software is rendering.

What is needed is a compact color calibration apparatus that (1) efficiently disperses a light beam into a continuous interval of wavelengths and analyzes the content of the light beam throughout this interval; (2) allows shifting of augmentation of the wavelength interval to be analyzed; (3) allows flexibility and alteration of the light sources and light beam intensity distribution received by a plurality of wavelengthsensitive photodetector elements; (4) provides sharply defined, very narrow bands of light of different wavelengths at each photodetector element with no side band problems; (5) allows construction of the apparatus on a single chip that is compact and rugged and has low cost; (6) allows use of this apparatus for spectrophotometry or colorimetry work on a variety of self-luminous or nonself-luminous objects whose color is to be measured or monitored; and (7) allows automatic entry of the tristimulus values sensed into a computer for further analysis and computation.

SUMMARY OF THE INVENTION

These needs are met by providing a colorimeter for determining the color composition of the small predetermined area at an arbitrary position of an object, where the colorimeter includes a variable wavelength light filter having a light-receiving surface to receive a light beam that has a plurality of wavelengths in a selected wavelength band. The light filter disperses the beam into a plurality of wavelengths that increase monotonically with position x in a selected direction lying in the light-receiving surface, and the light filter either reflects the dispersed beam from, or transmits the dispersed beam through, the filter. For any position x, the light reflected from or transmitted through, as the case may be, the light filter is confined to a very narrow wavelength pass band with no side bands being transmitted at that position x. The colorimeter apparatus also includes light restriction and focusing means for receiving and admitting light from a restricted portion of the object that defines the small predetermined area and for directing this light to the light-receiving surface of the light filter. An array of photosensors is also provided, positioned to receive light reflected from or transmitted through the light filter so that each photosensor in the array receives light in a very narrow band of wavelengths having a central wavelength $\lambda_c(x)$ for light received and reflected (or transmitted) at the position x on the light filter, where $\lambda_c(x)$ increases monotonically with the value of the position coordinate x.

Where color of a non-self-luminous object is to be measured or monitored, the apparatus may optionally include a light source to illuminate different portions of the object. If this light source has a wavelength distribution that does not coincide with a reference, or ambient illumination, wavelength distribution, the photosensor array may include electronics or software that compensates for the non-standard nature of the wavelength distribution or light source.

The colorimeter apparatus may optionally be provided in a movable "mouse-like" color monitoring probe that measures or monitors the color content at an arbitrary position on the object as the apparatus is moved over the surface of this object. The mouse or probe may be tethered to the computer by a cord or wire that transports communications between the mouse or probe and the computer. Alternatively, the mouse or probe may be nontethered and may communicate with the computer in a wireless manner, using infrared or other signals for communication of data and control information.

The colorimeter-based computer system may further include color transform electronics that alters image pixel data to compensate for various color transfer functions of appended color imaging devices, such as printers, monitors and scanners, as measured by the colorimeter of the present invention.

The invention provides apparatus to sense and store data to match paint colors, fabric colors, film colors and dye colors for foods and perfumes, as well as compensation for different lighting conditions.

BEST MODE FOR CARRYING OUT THE INVENTION

Figure 1A:
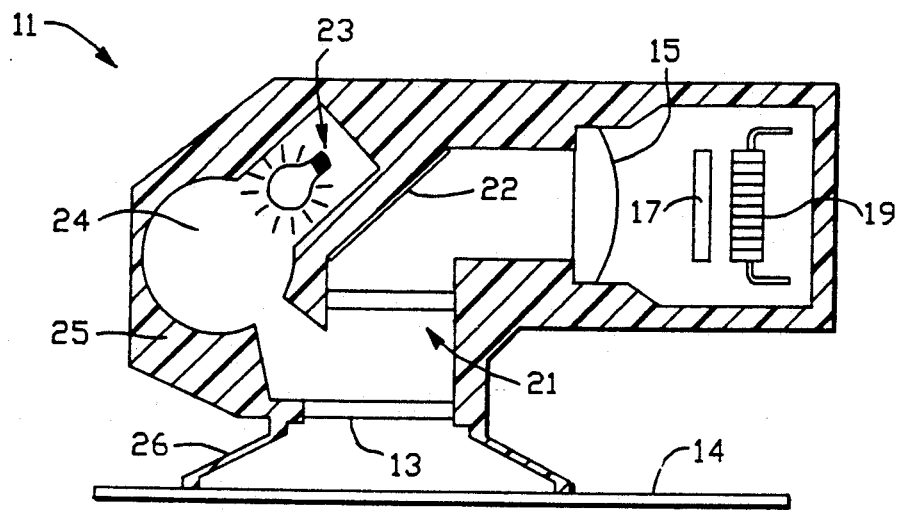
FIGS. 1A, 1B, 1C and 1D are cutaway sectional views of four embodiments of the colorimeter invention.

With reference to FIG. 1A, one embodiment of the color calibration device (spectrophotometer, spectroradiometer, colorimeter, etc., herein referred to simply as a "colorimeter") 11 includes a transparent window 13 that is placed adjacent to a local plane 14 of the viewed object (not explicitly shown in FIG. 1A) to receive light with wavelengths representing the object color. The window 13 may have a controllably variable aperture to limit the portion of the object from which light is admitted. This light from the object is transmitted through the window 13 through a lens or other optical focusing means 15, which focuses and directs this light to a variable wavelength filter ("VWF") 17 (transmission mode or reflection mode). A mirror or prism 22 may optionally be positioned in the beam's optical path to reflect or bend the light beam to conform to the lens focal length and packaging constraints. The light that issues from the variable wavelength filter 17 is received by a photosensor array 19, each photosensor receiving light from a single narrow band of wavelengths centered around a central frequency $\lambda_c(x)$, where x is a spatial coordinate measured in a selected direction along the lightreceiving surface of the VWF 17. The photosensor array 19 may include on-board processing electronics (not explicitly shown in FIG. 1A) to determine the wavelength distribution of light received from the object and to convolve this wavelength distribution with certain filter functions, such as the standardized 1931 CIE $\overline{xyz}$ color matching functions of the eye, to produce color values such as XYZ. Alternatively, the electronics for determination of the wavelength distribution and convolution integrals with an appropriate filter function, positioned elsewhere, may receive a sequence of electronic signals from the photosensor array 19 or from the colorimeter 11. Alternatively, the filter 17 may be three or more filters that individually match the wavelength passing characteristics of a color sensor for the eye.

The colorimeter 11 may optionally include a light diffuser 21, positioned between the window 13 and the lens or other focusing system 15 in FIG. 1A, or positioned between the lens 15 and the VWF 17, to diffuse the light received by the VWF from the portion of the object 14 that appears beneath the window 13 of the colorimeter 11. The window itself may be a light diffuser, as illustrated by the window/diffuser 13/21 in FIG. 1B, or may function as a wavelength trimmer by filtering or otherwise removing undesirable wavelength components from an incident light beam. Use of a light diffuser is intended to redistribute light in the incident light beam to remove any light "hot spots" and to provide a light beam of more uniform intensity incident on the VWF 17. Preferably, the diffuser is positioned at a focal plane for the lens 15. If the object is not self-luminous and requires illumination in order to adequately display its color(s), a light source 23 may be optionally provided to illuminate the portion of the object 14 that appears beneath the window 13. Light from the source 23 should be shielded so that it is not directly received by the light diffuser 21 (FIG. 1A), the lens 15, the VWF 17 or the photosensor array 19. Typically, light issuing from the source 23 will be distributed by an appropriate dispersion reflector 24, such as an integrating cylinder or sphere, to uniformly distribute the light beam intensity over the monitored area of the plane 14. These reflectors are well known in the colorimetry art. Optionally, the light source 23 may be located in a separate device into which the remainder of the probe apparatus 11 is inserted for color measurements of the object.

Figure 1B:
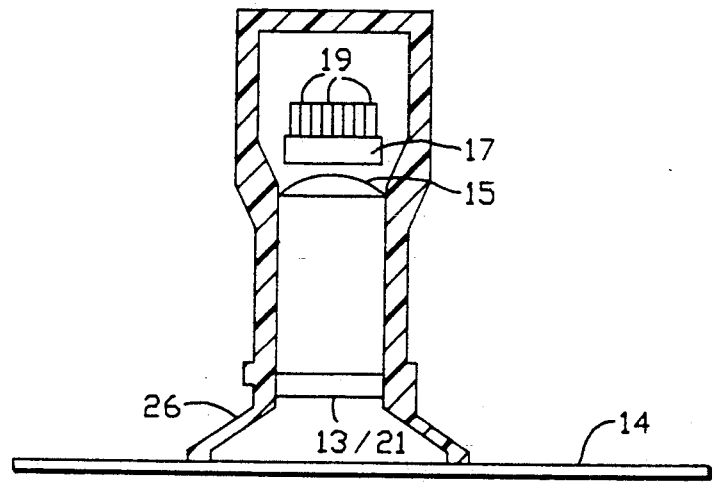

If the object is self-luminous, the light source 23 and dispersion reflector 24 are not used, as illustrated in the embodiment 12 in FIG. 1B. The colorimeter 11 may optionally be provided with a container or housing 25 that surrounds and contains all the components of the colorimeter 11, with the window 13 forming a portion of one wall of the housing 25. Optionally, the apparatus 11 may include a hood 26 that extends from the housing 25 to the plane 14 to shield the window 13 and all internal components from any external stray light that might otherwise enter through the window 13 and reach the filter 17 and/or photosensor array 19.

Those skilled in colorimetry will appreciate that the angle of incidence of light rays issuing from the light source 23 and passing to the object plane 14 for capture by the photosensor array 19, may vary according to specific applications. Commonly, the incidence angle may be adjusted to about 45° and the reflected cone angle may be adjusted to 2° or 10°.

Figure 1C:
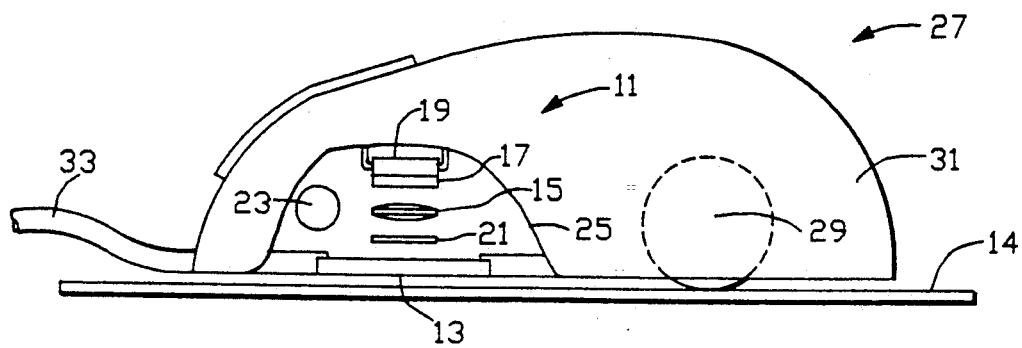

The colorimeter 11 may optionally be included as part of a "mouse" 27, as illustrated in FIG. 1C, that operates similarly to the mouse introduced by Apple Computer, Hewlett Packard, Microsoft and others for use as indicator and selector in entering computer commands. The mouse 27 would include a first position sensor 29 that senses motion in a first coordinate direction(s) by sensing rotational motion of a sphere or cylinder or similar object about an axis perpendicular to this direction. A second, analogous position sensor (not explicitly shown in FIG. 1C) senses position in a second perpendicular coordinate direction. The colorimeter 11 and the position sensor(s) such as 19 are contained in a mouse housing 31, and the mouse itself receives power and generates position signals and color wavelength distribution signals through a power cord 33 that may be attached to other processing electronics that are not shown here.

Figure 1D:
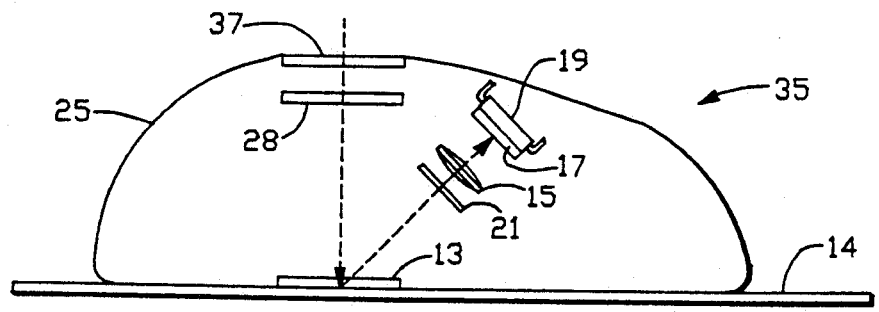

A fourth embodiment 35 of the colorimeter is illustrated in FIG. 1D. Here, the colorimeter uses only ambient light admitted through a second window 37 to illuminate a part of the object 14 that lies beneath the first window 13. The lens or other focusing system 15, the VWF 17 and the photosensor array 19 are now positioned to receive light from the object sensed through the first window 13 and so that these components do not interfere with illumination of the object by ambient light admitted through the windows 37 and 13. Again, optionally, a light diffuser 21 may be provided to diffuse light received from the object.

An alternate embodiment can be used that allows shuttering of the light source (ambient or other) so that both self-luminous and non-self-luminous objects to be analyzed using the colorimeters discussed here. In the embodiment of FIG. 1D, for example, a shutter 28 (optional) can be included for this purpose. The shutter 28 would be fully opened to admit light from the light source 23 in order to illuminate a non-self-luminous object; and the shutter 28 would be closed if the object whose colors are to be analyzed is self-luminous or if illumination through the second window 37 in FIG. 1D is not desired.

If the spectrum emitted by the light source 23 does not coincide with the ambient spectrum for the intended ambient illuminating light, the processing electronics associated with the photosensor array 19 may include electronic filters or other calibration means for adjusting the wavelength distribution received from the object by the array of photosensors to compensate for use of a non-ambient light source 23. The light spectrum received from the light source provided by the colorimeter and the light spectrum received from the ambient light source are analyzed separately for color content by a colorimeter device. These light spectral data are used to determine the appropriate compensation to be applied for the non-ambient light source. Typically, the spectrophotometer output signals will be multiplicatively factored by the ratio of ambient spectrum divided by lamp or light source spectrum for each measured wavelength interval, as shown in FIG. 3B. The desired result is a spectrum representing the visual stimulus that would enter the eye if a human being, rather than the colorimeter, viewed the colored object The desired output from the colorimeter is a tri-stimulus set of color values such as those set forth in 1931 CIE XYZ. The subjects of colorimetry, photometry and visual matching of colors are well set forth in the text *Color Science*, Gunter Wyszecki and W. S. Stiles, John Wylie & Sons, 1982, chapters 3, 4 and 5, which are incorporated herein by reference. In a preferred embodiment, much of the processing of signals generated by the colorimeter will be done in a host computer that is located elsewhere and receives such signals from the colorimeter by means of a bus in a well known manner.

The word "light" here is taken to refer to any portion of the electromagnetic spectrum. The word "stratum" here refers to a material with at least one light receiving surface, which can be a bare surface or a surface with a filter layer deposited on it.

A computer system in which the colorimeter is used, is complicated by the number of color corrections and other color transformations that must be executed for measurement and compensation purposes, usually in real time. Each object whose color(s) or wavelength distribution is determined by the colorimeter (e.g. a color monitor, color printer or color scanner), uses different colorants. Color monitors use color phosphors, colored printers use colored dyes and pigments, and color scanners use different colored filters with fluorescent lamps comprising various colored phosphors, each set of colors being spectrally unique from the others. Some devices, such as color monitors and color scanners, may exhibit amplifier drift that provides constantly changing color transfer functions within the device. One task of the signal processing device is to rapidly translate color pixel data from one color representation to another in order to correct or alter color data that are currently provided for a non-perfect peripheral device. Another task is to transform color pixel data from one color space to another.

Colorimeter System

Figure 2:
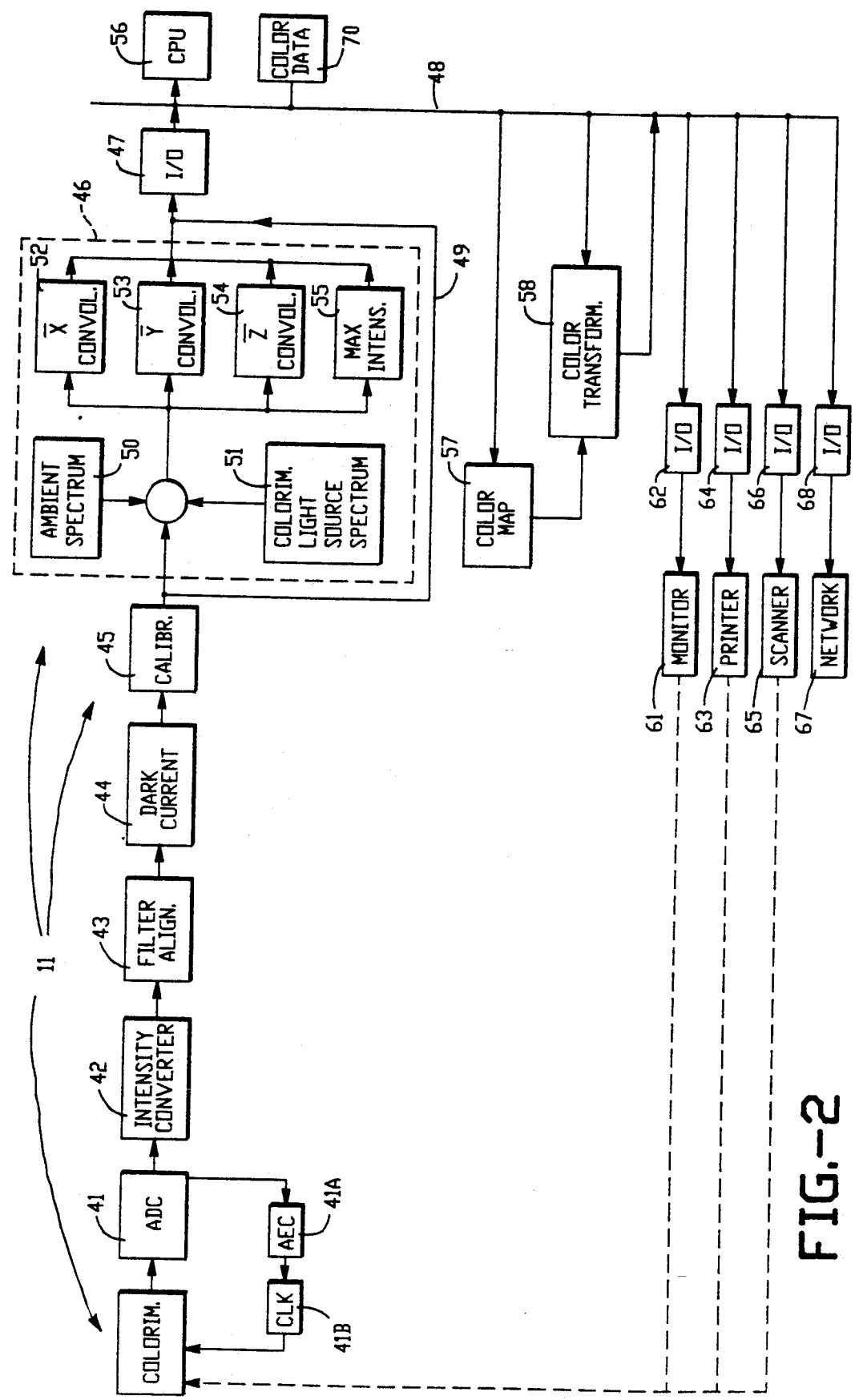
FIG. 2 is a block diagram of a system for color monitoring, conversion and correction in which the colorimeter invention may be used.

FIG. 2 illustrates, in block diagram form, color calibration and correction tasks that may be performed in use of the colorimeter such as shown in any of FIGS. 1A, 1B, 1C or 1D. A colorimeter 11 receives spectral data from one or more objects and transmits this data to an analog-to-digital converter ("ADC") 41 that transforms the data to digital form. This digital form data is received from the ADC by an intensity converter 42 (optional) that converts digitized optical energy E to intensity $I = E/\tau$, (where $\tau$ is the exposure time interval for the object) and transmits the intensity signal I to a filter alignment module 43, then to a dark current determination module for determination and subtraction of dark current signal values from each photosensor signal, then to a calibration module 45 that corrects the spectrum or wavelength intensity distribution information received from the colorimeter 11 with a reference spectrum or spectra. Optionally, the information generated by the calibration module 45 may be passed through an electronic filter 46 before this information is passed to an input/output port 47 that delivers such information to an information bus 48. The optical energy signal E produced by the ADC 41 is (optionally) also received by an auto exposure control ("AEC") module 41A (optional) that determines what the exposure time $\tau$ should be. The AEC module 41A then issues a control signal that is received by a clock module 41B (optional) that controls the exposure times $\tau$ for the wavelength intervals sensed by the colorimeter 11. A bypass signal path 49 may optionally be provided to transport the signal issued by the calibration module 45 directly to the I/O port 47 for delivery of this signal to the information bus 48.

In some applications, such as computer peripheral color calibration, the colorimeter must measure spectral irradiance over a 1000-to-1 or more dynamic range. This dynamic range is best accommodated in practical digital systems through exposure control. The exposure time for a particular photosensor, corresponding to a predetermined, small wavelength interval, may be varied to decrease the error and increase the cumulative optical signal received at that photosensor so that the signal falls between two predetermined thresholds that define a region of maximum photosensor sensitivity. The optimum exposure time $\tau$ for a given photosensor, or for all photosensors, may be determined by the auto exposure control module 41A and converted to an equivalent frequency to drive a clock 41B that controls the exposure(s). Intensity I in a particular wavelength interval is obtained from cumulative optical energy E received in that interval by the relation $I = D/\tau$, as noted above.

An appropriate exposure time $\tau$ for a particular wavelength interval may be determined as follows. Assume the cumulative optical energy for the peak wavelength (the interval receiving the maximum cumulative energy in a test time interval of length $\Delta t$) has a value $E_p$, and assume that the photosensors can measure cumulative optical energies E most satisfactorily in a range given by $E_{min} \leq E \leq E_{max}$. If $E_p > E_{max}$, reduce the exposure time $\tau$ to $r_1 \Delta t$ where $r_1 \leq E_{max}/E_p$. If the cumulative optical energy $E_p$ exceeds a saturation value $E_{sat}$ the exposure time $\tau$ might be reduced by successive factors of two until the new $E_p$ satisfies $E_p < E_{sat}$. If $E_p < E_{min}$, increase the exposure time $\tau$ to $r_2 \Delta t$ where $r_2 \geq E_{min}/E_p$. This exposure time adjustment procedure can be applied to any wavelength interval. The accumulated energy range E for a photosensor signal may have a large dynamic range. This quantity E must be adjusted, by adjustment of exposure time $\tau$ so that the adjusted value of E falls in a range allowing optimal resolution, based on the quantization or bit resolution allowed by the analog-to-digital converter. By distributing the energy optimally over the available bit resolution range, quantization error is reduced or minimized.

The filter alignment module is used to determine which wavelength interval of the VWF 17 in FIGS. 1A, 1B, 1C and 1D corresponds to each photosensor in the array 19. As an example, a Hg lamp emission line such as the $\lambda = 546.1$ nm line may be transmitted to the VWF, and it may be determined that this spectral line is received by photosensor no. 121 in a 256-photosensor array 19. The two photosensors corresponding to wavelength cutoff, for example, $\lambda = 385$ nm at the violet end of the spectrum and $\lambda = 725$ nm at the red end, may be determined. If light of wavelengths $\lambda = 385$ nm and $\lambda = 725$ nm is received predominantly at photosensor nos. 14 and 248, respectively, signal information received at photosensors no. 1–13 and 249–256 would be discarded and not processed further. The wavelength intervals between $\lambda = 385$ nm and $\lambda = 725$ nm would then be distributed among the photosensors no. 14–248, with photosensor no. 121 receiving light in a narrow wavelength interval including the wavelength $\lambda = 546.1$ nm. These wavelength intervals would be distributed linearly or non-linearly between the two cutoff wavelengths depending on whether the central wavelength $\lambda_c(x)$ increases linearly or non-linearly with increasing values of the position variable x.

The dark current subtraction module 44 includes memory to store the measured intensity response of each photoelement in photosensor array 19 in the absence of any light exposure. The dark current values are obtained by blocking light entrance to the sensor and storing the measured intensities. The measured dark current values for each photoelement are then subtracted from the respective photoelement intensities obtained from all subsequent spectral measurements. As is well known in the photosensor art, photosensors produce charge in the absence of light as well as in its presence. Dark current is primarily thermally induced, and rises rapidly with increasing temperature T. For accurate color measurements, dark current must be measured on a regular basis by the user. The necessity for frequent measurements can be reduced by monitoring the temperature of the photoelements and adjusting the dark current values with temperature, as the dark current of a given photoelement rises exponentially with temperature. The temperature may be monitored by providing photoelements along the array that are protected from light exposure, by an opaque covering. These elements would only be capable of producing dark current, and the relative changes in their response can be applied to dark current values of the exposed photoelements. Temperature measurement can also be obtained by use of thermistors and other similar devices.

Not all photosensors have a linear dark current response with exposure time. With auto exposure control, it may be possible to calibrate, read dark current, and measure color at more than one exposure time, leading to a small level of color measurement error. The characteristic non-linearity in dark current contribution $E_d(\tau,T)$ to intensity may be minimized by developing a table of compensation values $K_d(\tau,T)$ for each exposure time $\tau$ or for a number of exposure time ranges, such that the computed dark current contribution to intensity I may be correctly computed as $I_d = E_d/K_d\tau$, which does not vary much with change of exposure time $\tau$. The compensation value $K_d$ for each exposure range is obtained by recording the dark current intensity response $(E_d/\tau)$ of the sensor over the desired exposure range at a chosen temperature T, or by computing the ratio of spectral and dark current responses for a covered photosensor. In all subsequent measurements (including calibration), the appropriate $K_d$ value is retrieved from memory and applied to the computation of each photoelement intensity response for a given exposure time. The compensated average light intensity then becomes $I' = (E(\tau)/\tau) - (E_d(\tau)/K_d(\tau)\tau)$. The forementioned compensation would be part of the function of the intensity converter 42 and the dark current module 44.

Calibration module 45 includes memory to store calibration factors for each photosensor and means to multiply each photosensor intensity by the respective calibration factor stored in memory. Calibration is an essential step for accuracy in spectral measurement. The intensity values obtained from the photosensor array 19 typically have errors due to photoresponse non-uniformities along the array, such as wavelength-dependent responsivity, bandpass shape and transmission variation along the length of VWF 17, and non-uniformities in the optics. These device-dependent and fixed non-uniformities can be compensated for by calibration. Through measurement, a calibration factor for each photosensor is determined that corrects the colorimeter response to a source with a precisely known spectrum, for example a black body radiator. The factors for each photoelement are digitally stored in a calibration lookup table of calibration module 45.

The electronic filter module 46 includes a first sub-module 50 containing the ambient wavelength spectrum, wavelength interval-by-interval, that represents the preferred illumination source for non-luminous objects. The filter module 46 also includes a second sub-module 51 containing the wavelength spectrum of the light source supplied by or in association with the colorimeter. As noted above, the ambient spectrum is divided wavelength interval-by-interval by the colorimeter lamp spectrum for use in compensating for use of a non-ambient light source in illumination of a non-luminous object. The filter module 46 also includes sub-modules 52, 53 and 54 for receiving the uncompensated or compensated photosensor intensity signals and for forming the tristimulus convolution integrals X, Y and Z, respectively. Optionally, the filter module 46 may also include a sub-module 55 that determines the photosensor channel with the maximum intensity, and the maximum intensity thereof.

The electronic filter module 46 might be used, for example, to compensate for the use of a non-ambient light source in illumination of a non-luminous object or objects monitored by the colorimeter 11. The signal value received by each photosensor in the array 19 (FIGS. 1A, 1B, 1C and 1D) represents the component of incident light lying in a predetermined, small wavelength range. Signal values from direct illumination of the VWF 17 by the colorimeter light source 23 are compared with one another and with relative photosensor signal values produced by direct illumination of the VWF 17 by an ambient (reference) light source 23, with these two sets of signal values being provided in a memory. The presently received photosensor signal value (assumed to be nonzero) may be multiplied by the ratio of the direct illumination, ambient source signal value divided by the direct illumination, non-ambient source value within the electronic filter module 46, to compensate for illumination of a non-luminous object by the non-ambient light source 23. These compensated signal values, rather than the presently received signal values, may be used for subsequent colorimeter computations. The compensated (or uncompensated) signal values $I(\lambda)$ may be convolved with the CIE color matching functions $\bar{x}(\lambda)$, $\bar{y}(\lambda)$ and $\bar{z}(\lambda)$ stored in memory to relate the spectrum to tristimulus convolution integral values X, Y and Z by the equations $$X = \int I(\lambda) \bar{x}(\lambda) \, d\lambda, \tag{1}$$

$$Y = \int I(\lambda) \bar{y}(\lambda) \, d\lambda, \tag{2}$$

$$Z = \int I(\lambda) \bar{z}(\lambda) \, d\lambda. \tag{3}$$

Figure 3A:
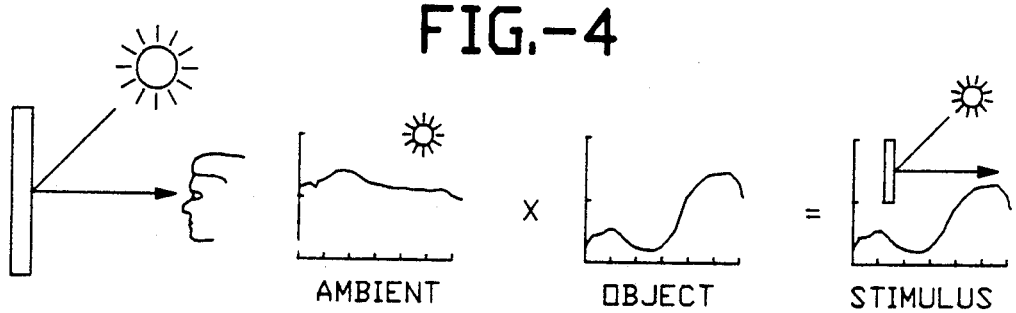
FIGS. 3A and 3B illustrate illumination of a non-luminous object by an ambient source and non-ambient light source, respectively.
Figure 3B:
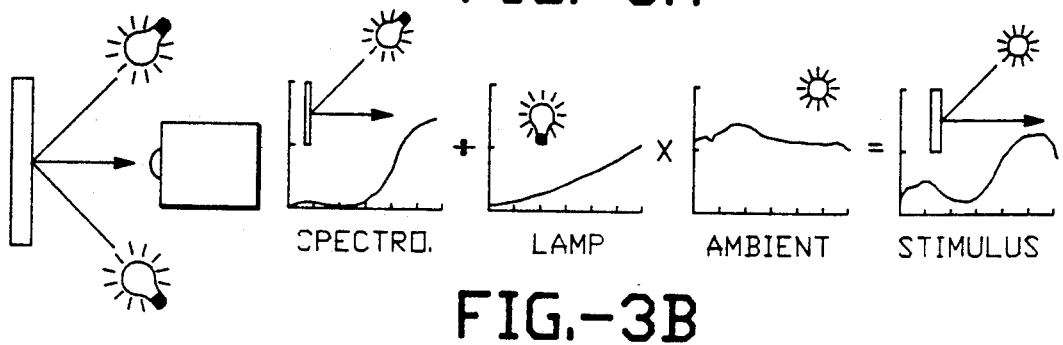

Illumination/compensation of the object by the ambient and colorimeter light sources are illustrated in FIGS. 3A and 3B.

Information placed on a bus 48 is received by a central processing unit ("CPU") 56, part of a computer system, for further processing if necessary. Information carried on the bus 48 is also received by a color map module 57 and by a color transform engine 58 that perform appropriate color transformations upon the information received based upon the nature of the object that produced the color data. The CPU 56 controls data distribution to and from a plurality of peripheral devices such as a monitor 61, a printer 63, a scanner 65 and any network connection 67. These three peripheral devices 61, 63 and 65 and network connection 67 have the respective input/output ports 62, 64, 66 and 68, respectively, connected to the bus 48 and thereby to the CPU 56. Color or wavelength distribution information from the monitor 61, the printer 63 and the scanner 65 is optically collected and is read by the colorimeter 11 to complete the circuit. Data sent along the network channel would be converted to a standard color data format, preferably based on a system such as the CIE Lab, YUV or LUV coordinates. Color conversion or compensation information can be processed in real time by the system shown in FIG. 2.

Figure 4:
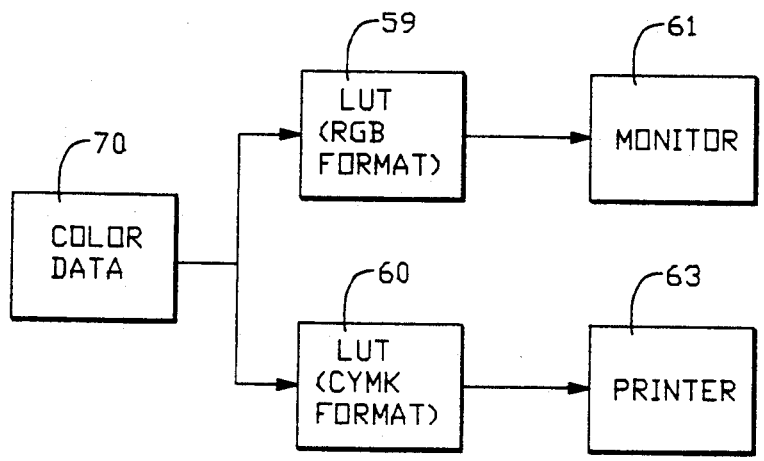
FIG. 4 is a block diagram illustrating provision of different color formatting for each of two peripheral devices.

The CPU 56, or an alternative co-processor or state machine, computes a table of color conversion values for each peripheral device measured by the colorimeter. In some instances color conversion may be processed using standard matrices where CPU 56 would determine the conversion matrix coefficients to convert color data from one tri-stimulus representation to another. The non-linear behavior of many peripheral devices, such as printers, degrades the accuracy afforded by simple matrix conversion. In such instances, the conversion values preferably include a mapping of color data values from a given data representation to the representation used by the particular peripheral device. Normally, the mapping will also include color gamut compression or other compensation for the best mapping of colors in a data representation that cannot be exactly produced by the given peripheral device. The color conversion values loaded into the color map module 57 are changed in content for each color conversion process by the CPU 51 that controls it. Normally, color image data will be stored in a color data module 70 associated with the CPU 56 and transmitted along the network between computer systems in a standard format, preferably according to a colorimetric standard such as the CIE Lab luminance/chrominance values. These data may be converted to a device-dependent color format, such as RGB or CYMK, adjusting the conversion map to include the device calibration. As illustrated in FIG. 4, color data stored in the color data module 70 may be converted by a first look-up table 59, calibrated in RGB color format, for display on a specific monitor 61, and the formatted color data may then be displayed on that monitor 61. The color data stored in the color data module 70 may also be converted by a second look-up table 60, calibrated in CYMK color format, for printing on a specific printer 63.

One task of the color map module 57 may be to convert a particular set of color tri-stimulus device-independent values such as CIE XYZ, Lab, YUV or LUV to a set of color tri-stimulus device-dependent values such as RGB (red/green/blue) or CYM (cyan/yellow/magenta), or conversely, to evaluate video or other color presentations. A color map used to evaluate an RGB color monitor will differ from a color map used to convert or monitor colored objects produced by a CYM color printer 63. The color map can also be used to convert uncorrected image color format, such as RGB or CYM, to a device-dependent, corrected image color format, for display of the image on a particular monitor, printer or scanner. The CPU 56 will compute the color map requirements based on accepted conversion algorithms, will determine color map contents from experimental data held in memory, or will compute or interpolate alterations to this experimental data based upon calibration information received from the colorimeter 11.

The contents of each color map produced by the color map module 57 may represent a small fraction of the number of possible colors represented in the image data. Intermediate color values not specifically contained in a given color map may be interpolated by using the color transform engine 58 and a linear or non-linear three-dimensional interpolation scheme.

Each peripheral device is calibrated by comparing the ideal or reference response of the device to a given stimulus with the actual response of the peripheral device. The monitor 61 and the printer 63, for example, receive commands for outputs from the CPU 56 under control of software. The response of the displayed colors on the monitor 61 and printed colors on the printer 63 are accurately measured by the colorimeter 11 and are fed back as XYZ tri-stimulus values to the CPU 56. Any color errors produced by the peripheral device being monitored are used to generate or modify the contents of the color map module 57 so that, when subsequent output commands for color are given by the CPU 56, the output of this peripheral device will be corrected and made as near to the ideal or reference values as possible. The network shown in FIG. 2 thus represents a feedback loop in which the spectral or wavelength distributions associated with a given peripheral device are first monitored and then corrected.

Calibration of a scanner device 65 is accomplished by scanning and colorimetrically measuring a color test chart, feeding the colorimeter output values to the CPU 56, comparing the values sensed by the colorimeter 11 with the values from the scanner, and determining a color map for translating scanner output data into device-independent form.

Figure 5:
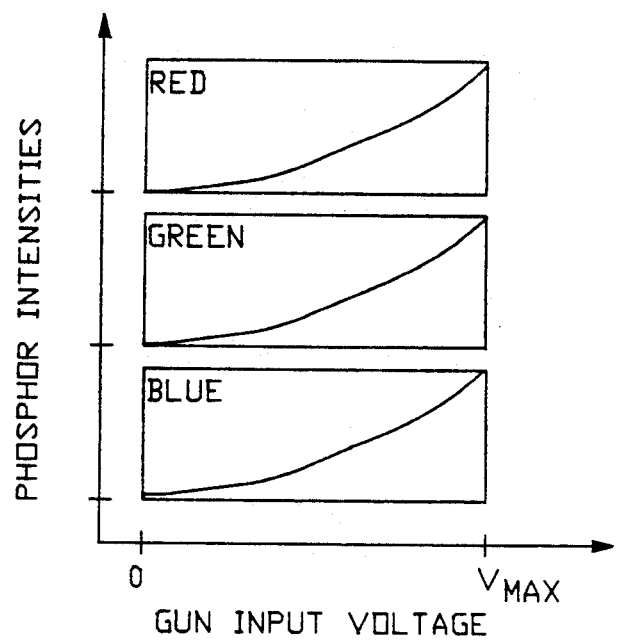
FIG. 5 graphically illustrates the change in R, G and B phosphor intensities as the input voltage to the corresponding electron gun is varied.

Calibration of a color monitor is accomplished by first measuring the spectrum of each, RGB phosphor used in the monitor at full gun intensity and measuring the monitor's full intensity white, produced by a fixed combination of the R, G and B colors. These spectra are then converted to XYZ values, as described above. The transfer function of each gun is determined by measuring the intensity at a spectral peak for each phosphor at a sequence of gun input voltages between zero phosphor intensity and full phosphor intensity. Normally, measurement of output intensities for five to seven different voltages suffices for each phosphor. FIG. 5 exhibits typical gun transfer functions for the R, G and B phosphors. The gun transfer functions may be used to determine gain, offset and gamma values for each gun. Knowledge of the gun chroma and transfer functions can then be used to compute conversion color maps or matrix coefficients. The color transform engine 58 is used to make the pixel data corrections required to correct the color values associated with a given peripheral device. A combination of the colorimeter 11, the CPU 56, the color map module 57 and the color transform engine 58 can thus provide for monitoring, conversion and correction of the color data associated with each peripheral device.

After the color values associated with a given color conversion have been determined, these values may be stored in memory and retrieved for use as needed. These values would only be changed if re-calibration is required. It may be preferable to incorporate the colorimeter 11, color map module 57, color transform engine 58 and CPU 56 in the host computer to allow manual calibration of a host computer system. The colorimeter 11 may be hand held and may be provided with an attachment through an I/O port to the remainder of the computer system shown in FIG. 2. The colorimeter 11, color map module 57, color transform engine 58 and CPU 56 may also be provided as a part of a peripheral device to allow auto-calibration. The colorimeter 11 may also be a stand-alone device, with color values being displayed or stored for later transfer to a color matching system.

In colorimetry, a color-sensing apparatus receives light having a plurality of wavelength components (1) from a self-luminous object or (2) as reflected or transmitted light from an object that is illuminated by a light source. In this second instance, the wavelength distribution sensed by the color-sensing apparatus depends, in part, on the wavelength distribution of the illuminating light source. In order to eliminate the influence of the illuminating light source, the wavelength distribution of this light source is "divided out" or compensated for, wavelength interval by interval, and the effect of use of a reference light source is factored in, wavelength interval by interval. As a result of this, the wavelength distribution sensed by the colorsensing apparatus after compensation includes only the effect of illumination of any object by the reference light source.

Previously, this compensation was usually implemented by using color filters having large transmission wavelength intervals so that the compensation procedure was not very accurate. The compensation approach afforded by the invention disclosed here allows compensation using wavelength intervals as small as $\Delta = 1.5$ nm width, or smaller if desired. This compensation approach also allows compensation for the non-uniform sensitivity, as a function of wavelength, of the individual light sensors and optical and VWF components that are part of the apparatus. The compensation process is carried out electronically here for each separate wavelength interval of width $\Delta\lambda$. The wavelength distribution of the received light is convolved separately with the $\bar{x}(\lambda)$, $\bar{y}(\lambda)$ and $\bar{z}(\lambda)$ color matching functions to convert the received light spectrum into tristimulus values.

The system of FIG. 2 may also be adapted to provide correct color rendering by a peripheral device located in an ambient environment that differs spectrally from the ambient environment of the user workstation. Such conditions occur for shared printers, for example, that may be remotely located in, and accessed over, a network by a printer server. In such instances, the ambient spectrum of the user workstation may be measured by colorimeter 11 and transmitted over a network 67 to the print server. A similar system as in FIG. 2, located within the server, would be used to calibrate the remote printer 63. The contents of the color map module 57 or matrix coefficients used in the server, however, would be computed using the ambient spectrum of the user workstation instead of using the spectrum of the server ambient illumination. The resultant print, would thereby appear correctly colored when viewed in the user environment. Similarly, print colors can be manipulated to appear correct in any given ambient environment by transmitting the target ambient spectrum to the CPU 56 that controls the target printer 63 and conversion map generation. A user operating in an incandescent illumination environment, for example, could produce printed images appearing color correct in sunlight or in fluorescent illumination by forwarding the appropriate target ambient spectrum to the controlling CPU 56. Such spectra may optionally be accessed from a library of spectral values.

Figure 6:
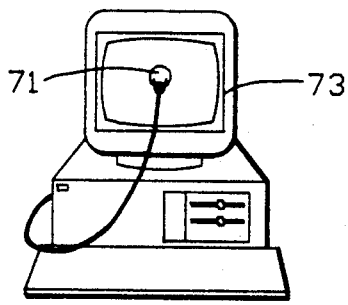
FIGS. 6 and 7 illustrate the use of a colorimeter probe, constructed according to the invention, to sense color on a color monitor (luminous source) and on a color printer printout (non-luminous source), respectively.
Figure 7:
Figure 7:
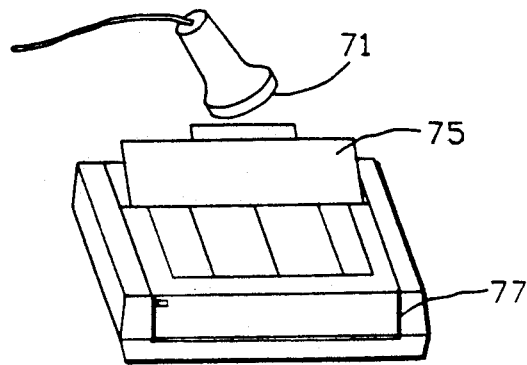

A colorimeter, constructed according to the invention, may include a probe 71 that can be placed contiguous to the screen of a color monitor 73 or other self-luminous source, as in FIG. 6, to sense the color(s) present on that part of the monitor screen, using the VWF and photosensor array combination discussed herein. The probe 71 may be moved from one area to another on the screen of the monitor 73 to sense and calibrate different patches of colors displayed on the screen. The probe 71 may also be used to sense a patch or patches of color on a non-luminous object, such as a color printer 77 shown in FIG. 7. The object, a page 75 containing colored portions that the printer 77 has issued, is illuminated by an ambient light source 79, and the probe 71 is then pointed at, and used to sense the wavelength distribution of light emitted by, the source 79 for calibration and (optionally) compensation purposes. The color sensed on an object, such as the screen of the color monitor 73 or on a page 75 issued by a color printer 77 may also be entered into a computer system for use in graphics or computer aided design.

Filter Construction

The variable wavelength filter 17 used in the colorimeters shown in FIGS. 1A—1D is described in various embodiments in a related patent application, U.S. Ser. No. 07/480,172, filed by the inventor hereof on Feb. 14, 1990 and assigned to the assignee of this application. These embodiments of the filter(s) include the following.

Figure 8:
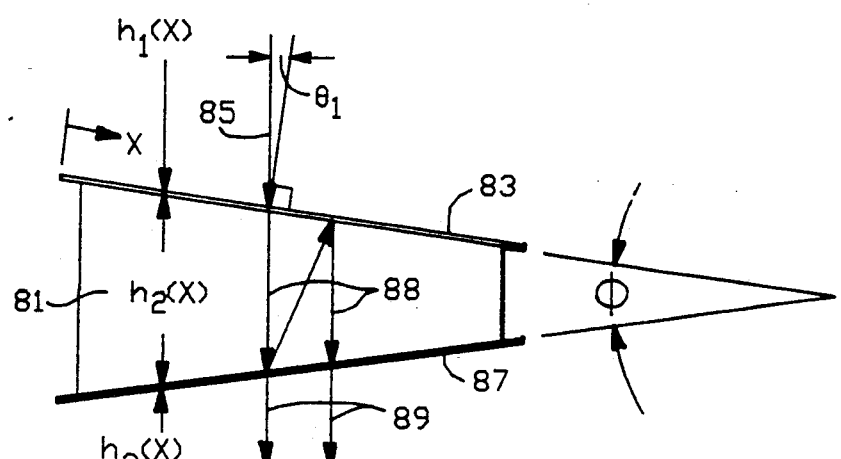
FIG. 8 is a side view of one embodiment (transmission mode) of the filter invention in which the distance of separation of two reflecting planes increases monotonically with a spatial coordinate x.

(1) A wedge of light filter material whose thickness $h_2(x)$ in the direction of light propagation varies linearly, as shown in FIG. 8, or non-linearly with a spatial coordinate x measured in a selected direction lying in a light-receiving surface of the filter. The filter 81 shown in FIG. 8 is a wedge-shaped stratum of filter material having a first light-receiving surface 83 that receives an incident light beam 85 at an incidence angle $\theta_1$ and having a second light-receiving surface 87 that is spaced apart from the first surface 83, where these two surfaces are both planar and intersect one another at a small, non-zero angle $\Phi$. One or both of the light-receiving surfaces 83 and 87 may have a coating or other filter layer thereon, of respective thicknesses $h_1(x)$ and $h_3(x)$ as shown. Although FIG. 8 illustrates operation of the filter 81 in a light transmission mode, the filter may also be operated in a light reflection mode. At each spatial position x, the thickness $h_2(x)$ at that position will promote the transmission (or reflection) of light of wavelength $\lambda = \lambda_c(x) = 2n_2 h_2(x)$ $(\lambda = \lambda_c(x) = 4n_2 h_2(x))$ and light of certain side band wavelengths that are spaced apart from the wavelength $\lambda_c(x)$, where $n_2$ is the refractive index of the filter material. In order to suppress or eliminate the side bands, a narrow band variable wavelength light filter as discussed above is used in serial combination with a wider band variable wavelength light filter that passes the central wavelength $\lambda = \lambda_c(x)$ but suppresses the undesired side bands. The serial combination of the narrow band filter and the wider band filter is the variable wavelength filter ("VWF") 17 that is used in FIGS. 1A, 1B, 1C and 1D.

The variable distance of separation $h_2(x)$ between the two reflecting surfaces or layers 83 and 87 in FIG. 8 preferably is monotonically increasing or monotonically decreasing with increase of a spatial coordinate x and includes at least one position $x_0$ for which $h_2(x_0) = m_2 \lambda_c / 2n_2$, where $m_2$ is a positive integer and $n_2$ is the real part of the refractive index for the filter material in the filter stratum 81. Thus, for at least one position $x_0$ along the filter the total optical path length for transmission through the stratum 81 is an integral multiple of the half wavelength $\lambda_c/2$. The incident light may arrive with a small or modest incidence angle relative to the first light-receiving surface 83. In practice, this incidence angle is usually chosen to be zero degrees. The spatial coordinate x may be a rectilinear variable such as a Cartesian coordinate, may be an angular variable such as a polar or azimuthal coordinate, or may be any other curvilinear spatial coordinate.

Passage of a light beam through a single wedge-shaped stratum of filter material 81 may produce fringes at nearby wavelengths that are commensurate with the central wavelength for which the system is designed. Optionally, one can include a single filter layer on one of the light-receiving surfaces 83 and 87 of the filter stratum 81; or two or more filter layers can be provided at one or both of the light-receiving surfaces 83 and 87 of the stratum 81. These filter layers are chosen to have a relatively narrow wavelength band pass region centered at or near a central wavelength $\lambda_c$ of interest and to filter out by absorption or reflection any incident light at any fringe wavelengths that might otherwise be present in the transmitted beam 89.

A function $h(x)$ is defined to be monotonically increasing in the coordinate x if $h(x_1) \leq h(x_2)$ whenever $x_1 < x_2$. In the embodiments of the invention discussed herein, it is sufficient if the variable distance of separation $h(x)$ of two surfaces increases (or decreases) monotonically with the spatial coordinate x so that intervals of constant separation $h(x)$ may be interspersed with intervals where $h(x)$ increases strictly monotonically with x ($h(x_1) < h(x_2)$ whenever $x_1 < x_2$). One example of a monotonic, but not strictly monotonic, increasing function is the distance $h(x)$ between a reflecting surface 165 and a sequence of staircase step reflecting surfaces 167-q (q=1,2, ... ) illustrated in FIG. 16, discussed below. An example of a strictly monotonically increasing function is the distance $h(x)$ between the two light-receiving surfaces 83 and 87 shown in FIG. 8.

The materials from which the first and second reflecting surfaces 83 and 87 are made should be at least partly transmitting and should absorb at most only a small fraction of the light of wavelength $\lambda_c$ transmitted through that thickness of material. The materials for the first and second reflecting surfaces 83 and 87 and for the filter stratum 81 may be drawn from glasses, insulators, semiconductor materials such as silicon and germanium, metals such as aluminum, or other materials such as magnesium fluoride, zinc sulfide, calcite, sapphire, and oxides of aluminum, silicon, germanium, calcium, cadmium, titanium, cerium and zirconium. The spacer material for the filter stratum 81 should be transmitting, with a small or infinitesimal absorption for the light of wavelength $\lambda_c$ and the range of thicknesses $h_2(x)$ used here. The material for the spacer layer may also be vacuum or air, if the layers 83 and 87 serve as reflecting surfaces for the incident light.

Thin film optical filters are well known in the art. They are normally constructed by vacuum deposition of alternating high and low refractive index optic layers on a given substrate, such as glass. The comparative phrases "high refractive index" and "low refractive index" are used relative to one another here. In the visible and near-infrared wavelength regions, a low (high) refractive index material might have an index of refraction $n \leq 1.7$ ($n > 1.7$). In the remainder of the infrared wavelength region, a low (high) refractive index material might have an index of refraction $n \leq 2.5$ ($n > 2.5$).

Light entering a stack of optically transmitting layers is partially reflected at the boundaries of each layer, with a reflectance amplitude determined by the ratio of the refractive indices across the boundary. A reflection that occurs when a beam approaches a higher refractive index medium from within a lower index medium includes a 180 degree phase shift. A reflection that occurs when a beam approaches lower refractive index medium from within a higher index medium has no phase shift at the boundary. The reflected beams recombine constructively or destructively depending on their phase relationship./ By constructing the optical filter with multiple thin layers, each having an optical thickness equal to a quarter wavelength of the incident light or an appropriate multiple thereof, the transmittance or the reflectance of the filter can be made high over a limited range about a central wavelength, and at certain fractional multiples of this wavelength, depending on the ratio of the high and low refractive indices and number of layers.

Outside these spectral zones the reflectance of the multi-layer combination changes abruptly to a low value. The range of reflected wavelengths can be extended by including additional layers of different quarter wavelength thickness, by varying the layer thicknesses, and by maximizing the ratio of refractive indices of successive layers used in the stack. When the filter is constructed of essentially non-absorbing optical materials, wavelengths of light not rejected by reflection are transmitted through the filter, and conversely. Because of this behavior, one can construct thin film optical filters having desired characteristics over a broad wavelength range, including but not limited to short and long wave pass edge filters, narrow and broad band pass, filters, and notch filters for both reflection and transmission applications.

Narrow band pass thin film filters are normally constructed using one of two approaches. A first approach combines two edge filters whose transmission ranges or reflection ranges overlap spectrally over a very narrow wavelength band of interest. Sharp edged short wave and long wave pass quarter wave plate filter stacks are well suited for producing narrow transmission bands. Here, the phrase "quarter wave plate" means an optically transparent material (with low absorption at the wavelength $\lambda$ of interest) having a multiplicative product of thickness h and refractive index $n(\lambda)$ that satisfies $hn(\lambda) = \lambda/4$, $3\lambda/4$, $5\lambda/4$, etc. The phrase "half wave plate" refers to an optically transparent material for which $hn(\lambda) = \lambda/2$, $2\lambda/2$, $3\lambda/2$, etc.

A second approach combines two or more half wave plate spacer strata, each sandwiched between two high reflection (typically greater than 80%) multilayer stacks, to form an interferometer similar to a Fabry-Perot interferometer. Light reflected within the spacer strata undergoes multiple beam interference. Transmission (or reflection) of light incident on the filter becomes extremely high only over a narrow band of wavelengths around that for which a spacer stratum optical thickness is an integer multiple of one half the wavelength of interest. In some instances, reflective metal layers, or combinations of thin film reflective coatings and metal reflectors, are substituted for the pure thin film high reflectance coatings described above.

In each of the above narrow pass band filter approaches, the desired wavelength bandpass is accompanied by higher or lower order fringes and side bands. These undesired bands must be suppressed by additional filtering, usually using combinations of broad band pass thin film filters, absorptive filters or different order Fabry-Perot type filters designed to spectrally overlap only at the desired narrow band pass zone. Normally, the combination of narrow band and broad band attenuation filters will require the coating of one or both sides of one or more substrate plates.

Many materials are suitable for thin film deposition of the light-transmitting layers and have low absorption within specific spectral regions. For the visible and near-infrared spectrum, some of the most common high index coating materials include germanium (refractive index n=4.0), silicon (n=3.2), zinc sulfite (n=2.35), titanium dioxide (n=2.2–2.4), zirconium dioxide (n=2.2), cerium oxide (n=2.2), zinc sulfide (n=2.12) and cadmium oxide (n=2.06). The most common low index coating materials for the visible and near-infrared spectrum include magnesium fluoride (n=1.38) quartz (n=1.45) silicon dioxide (n=1.5) and aluminum oxide (n=1.62). Antimony trioxide and cryolite are typically used as coating materials suited for the 300-400 nm region of the ultraviolet. For the mid- and far-infrared region, germanium (n=4.0) and lead telluride (n=5.5) are good high index materials, and zinc-sulfide (n=2.35) is a good low index material.

There are an unlimited number of combinations of quarter wave and half wave plate layers, and optical materials for producing filters of the varieties already described in treatises such as that of H. A. McLeod, *Thin Film Optical Filters*, MacMillan, 1986, incorporated by reference herein. This reference is representative of the types and number of designs available in the art.

Continuously variable narrow band pass interference filters, of the type used for the present invention, can be made by varying the thickness of one or more coating layers in the filter stack along a given direction in a plane of the filter stack. In one embodiment, the filter is a wedge defined by two planar layers, so that the center wavelength $\lambda_c$ of the narrow band pass filter will vary approximately linearly along the length or other selected direction of the filter. Each wedge or otherwise variable thickness filter stratum can be fabricated by moving a mask across the substrate during vacuum deposition of the filter layer on the substrate. The moving mask blocks deposition over areas shadowed by the mask. The desired coating thickness gradient can thus be produced by controlling the ratio of the deposition rate and mask translation rate.

Figure 9:
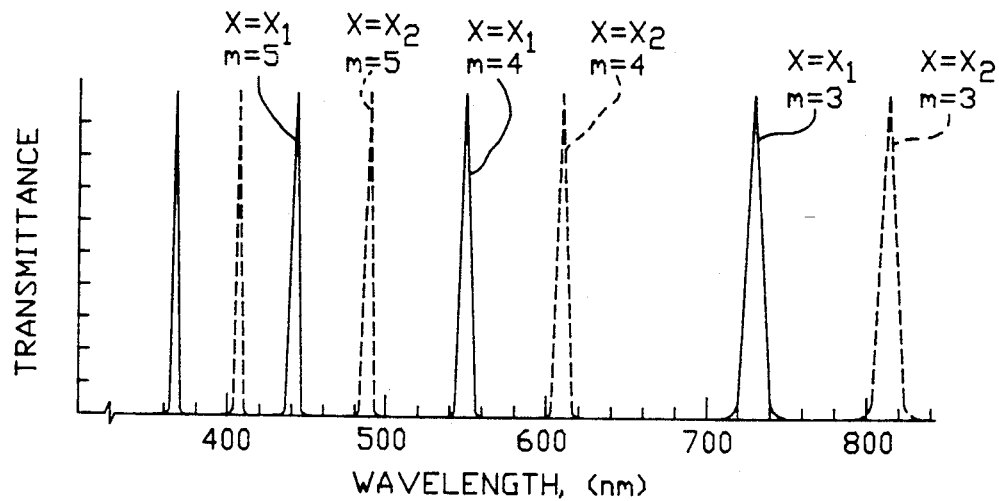
FIG. 9 is a plot of the spectrum of transmitted intensity versus wavelength of light for two positions, $x = x_1$ and $x = x_2$, for the embodiment shown in FIG. 8.

FIG. 9 shows the theoretical transmittance of the second order fringe of a two-cavity Fabry-Perot filter having 85% reflectance metallic layers and a glass spacer stratum (n=1.52) that varies linearly in physical thickness from about h=400 nm to about h=1000 nm along its length. The third, fourth and fifth order pass band transmittances peak at $\lambda=733$ nm, $\lambda=550$ nm and $\lambda=440$ nm wavelengths at the position of the filter where the half wave physical thickness is h=812 nm, 609 nm and 487 nm, respectively. The solid line transmittance curve and broken line transmittance curve correspond, respectively, to values of the coordinate $x=x_1=0.5L$ and $x=x_2=0.7L$ at the observation point, where L is the length of the filter. Intermediate peaks occur at intermediate wavelength positions between the two ends of the filter.

As mentioned before, a spectrally broad, high reflectance thin film stack can be substituted for the above metallic layers. The technique can be applied to a layer or layers of any of the above thin film filter types, including broad band pass filters, short wave pass edge filters, long wave pass edge filters, and narrow band pass filters, in transmission mode or reflection mode. Usually, a combination of filter types will be required to provide a single narrow band pass with side band or fringe blocking. Variable thickness layers are preferred in the side band blocking layers as well as in the narrow band pass layers so that in-band filtering and out-of-band filtering complement one another along the variable wavelength direction of the filter. However, the side band blocking filter may use a fixed pass band in some situations. Often more than one substrate will be required to accommodate all filter layers, and the substrates will need to be properly aligned.

If one ignores the variation of the separation distance $h_2(x)$ with x and concentrates on a light beam 85 incident on the filter stratum from above in FIG. 8, the normalized intensity reflection coefficient $I_r$ and the normalized intensity transmission coefficient $I_t$ for the filter stratum 81 alone become, respectively, $$I_r = \frac{4 R \sin^2(\beta/2)}{(1 - R)^2 + 4 R \sin^2(\beta/2)}, \tag{4}$$

$$I_t = \frac{(1 - R)^2}{(1 - R)^2 + 4 R \sin^2(\beta/2)}, \tag{5}$$

$$\beta = 4\pi \, n_2 h_2(x) \cos \theta / \lambda, \tag{6}$$

where $n_2(\lambda)$ is the refractive index of the filter stratum 81, $\theta$ is the incidence angle of the light beam, R is the reflection coefficient for the interface between the filter stratum 81 and the ambient medium. Absorption in the filter stratum 81 is ignored. This configuration produces a sequence of band pass regions separated by wavelength free spectral ranges of $\Delta\lambda = 2nh_2(x)\cos\theta/m$ (m=1,2,3,...) that depend upon R and fringe order m. These results are found in M. Born and E. Wolf, *Principles of Optics*, Pergamon Press, Fifth Ed., 1975, pp. 323-329, incorporated herein by reference. Inclusion of the effects of absorption in these equations would produce a small quantitative change in the results. For $R<1$ and $\theta=0$, the intensity transmission coefficient It is maximized by the choice $\sin \beta/2 = 0$ or $$h_2(x) = m(\lambda_c/2n_2) \ (m=1,2,3,\ldots); \tag{7}$$

for light of wavelength $\lambda = \lambda_c$. The intensity reflection coefficient $I_r$ is maximized by the choice $\sin \beta/2 = \pm 1$ or $$h_2(x) = (m - \tfrac{1}{2})(\lambda_c/n_2) \ (m=1,2,\ldots). \tag{8}$$

Different wavelengths are emphasized for the transmission and for the reflection situations, for fixed wavelength and thickness $h_2(x)$. These relations are true only for a single stratum. For multi-layer thin films, other considerations apply.

The apparatus shown in FIG. 8 is not, strictly speaking, a Fabry-Perot etalon because the reflecting planar surfaces or layers 83 and 87 are not quite parallel. Closely spaced groups of rays from the incident light beam will pass through substantially identical thicknesses $h_2$ of the filter stratum 81 and will not rapidly "walk off" the etalon because of the small angle $\Phi$ between the planes of the reflecting surfaces 83 and 87.

Two closely spaced groups of rays that are separated by a distance $\Delta x$ in the selected direction of the order of 10 $\mu$m or more may pass through substantially different thicknesses $h_2(x)$ of the filter stratum 81 and thus may manifest different interference effects. Thus, the portion 89 of the light beam 85 transmitted through the filter stratum 81 in FIG. 6 at two positions $x=x_1$ (unbroken lines in FIG. 9) and $x=x_2$ (dotted lines in FIG. 9) may exhibit peaks of transmitted light intensity $I(\lambda;x)$ at different sets of wavelengths, as illustrated in FIG. 9.

Alternatively, if one fixes the incident light beam wavelength $\lambda$ and observes the transmitted light intensity $I(\lambda;x)$ as a function of position x along the filter, a graph of this intensity will show a sequence of well separated peaks and intervening valleys. The set of wavelengths for which maxima of transmitted intensity $I(\lambda;x)$ occur will shift approximately continuously, and the magnitudes of these maxima will change approximately continuously, as one varies the position x of observation of the transmitted portion 89 of the beam shown in FIG. 8. Thus, one has in hand a technique for controllably and continuously shifting the peak wavelengths, which technique can be used in spectrophotometric, colorimetric and other applications.

An optical system such as the light filter embodiment shown in FIG. 8 promotes or enhances the intensity of light issuing at a selected fundamental wavelength $\lambda = \lambda_0$ of order $m=1$ and at other fringe wavelengths $\lambda = \lambda_0/m$ (m an integer $\geq 2$). If a higher order fringe is used for the central wavelength ($\lambda_c = \lambda_0/m$ with $m \geq 2$), the rise and fall with respect to wavelength of that fringe signal will be sharper than the corresponding rise and fall for the fundamental (m=1), but the center-to-center wavelength difference $\Delta\lambda$ of adjacent and undesirable fringes will be reduced. If, now, a broad band light filter is also provided for which a representative central wavelength is $\lambda_{bb,c} = \lambda_0/m_{bb}$ for the first or second order ($m_{bb}=1$ or 2), the attenuation with respect to wavelength will be less sharp but the fringe or side band wavelengths $\lambda = \lambda_0/m_{bb}$ ($m_{bb} \geq 2$) will be spaced apart much further and their presence may be ignored here. Thus, the serial combination of a narrow band pass light filter operating at a central wavelength $\lambda_c = \lambda_0/m$ ($m \geq 2$) and a broad band light filter operating at a central wavelength $\lambda_{bb,c} = \lambda_0/m_{bb}$ with $m_{bb}=1$ or 2, will produce a single, sharply attenuated, narrow band filter in which the controlling or central wavelength $\lambda_c$ may be caused to vary by the approaches discussed herein.

Preferably, a light filter according to the invention will be provided with both a narrow band filter and a broad band filter. The broad band pass filter may have a fixed broad band pass or may have a variable broad band pass with a central wavelength that is the same as, and changes with, the central wavelength $\lambda_c$ of the narrow band pass filter.

Figure 10:
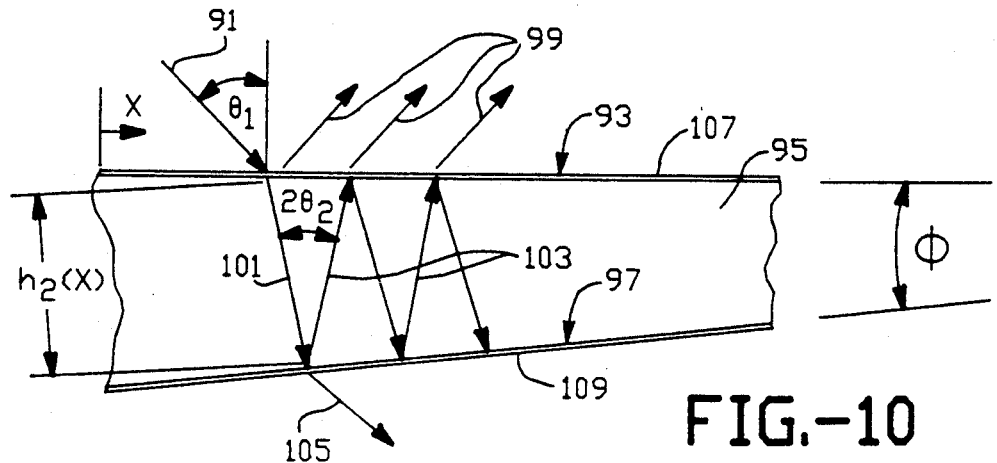
FIGS. 10, 11 and 12 are side views of three embodiments of the invention that operate in the reflection mode.

(2) The filter may also be operated in the reflection mode, as illustrated in FIG. 10 for a simple etalon with quarter wave plate spacing between the reflective surfaces, if the amplitude reflection coefficient R of the first reflecting surface is low (R $\leq$ 0.2). An incident light beam 91 approaches a first reflecting surface 93 of a wedge-shaped or variable thickness light filter stratum 95 at an incidence angle $\theta_1$. The stratum 95 has a thickness $h_2(x)$, measured between two reflecting surfaces 93 and 97 of the device, that varies with a coordinate x measured along some direction lying in the light-receiving surface 93. The incident light beam 91 is partly reflected at the surface 93, producing one of the reflected rays 99 in an array of such rays, and is partly transmitted at a refraction angle $\theta_2$ into the filter stratum 95 in a well known manner. The refracted light beam 101 is partly reflected at the second reflecting surface 97 of the filter stratum 95, producing a reflected light beam 103 that propagates back toward the first reflecting surface 93. The remainder of the refracted light beam 101 is transmitted and emerges as another light beam 105 that is treated here as a rejected light beam. High reflection at the surfaces 93 and 97 can be suppressed, except for a narrow, sharply peaked wavelength pass band, by use of appropriate anti-reflection coatings 107 and 109, respectively, at the surfaces. These coatings are discussed by H. A. McLeod, *Thin-Film Optical Filters*, op.cit., pp. 71-136.

Figure 11:
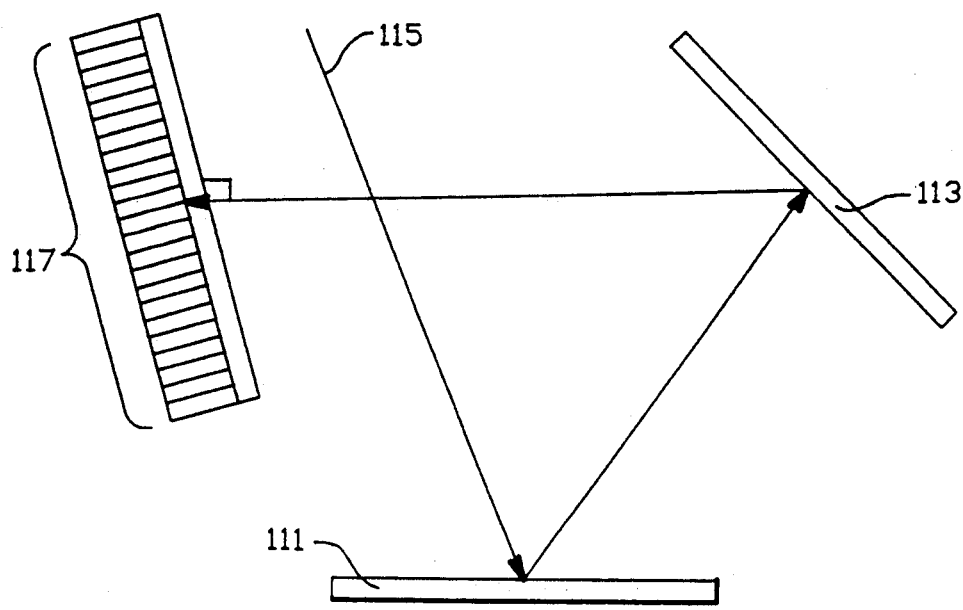

(3) A narrow band variable wavelength filter 111, operating in the reflection mode, followed or preceded by a wide band variable wavelength filter 113, also operating in the reflection mode, as shown in FIG. 11, where the initial light beam 115 is twice-reflected and received by a photosensor array 117 as shown. The narrow band and wide band variable wavelength filters are constructed as discussed above.

Figure 12:
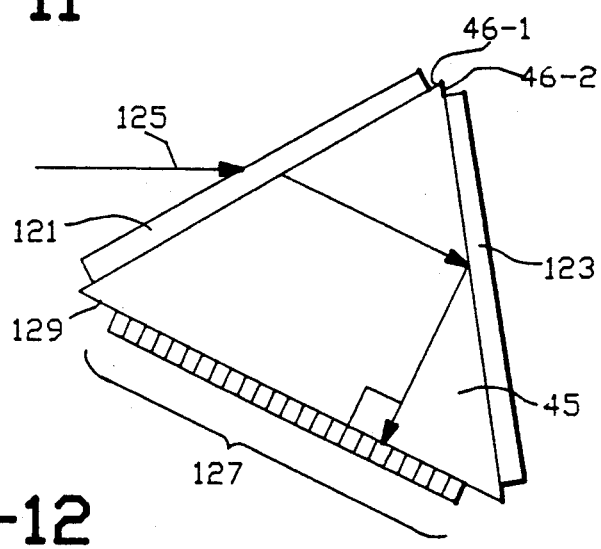

(4) A narrow band variable wavelength filter 121, operating in the transmission mode, followed or preceded by a wide band variable wavelength filter 123, operating in the reflection mode, as shown in FIG. 12, where the initial light beam 125 is once-transmitted and once-reflected and is received by a photosensor array 127 as shown. Alternatively, the transmission mode filter 121 may be wide band and the reflection mode filter 123 may be narrow band. Optionally, an optical prism 129 may be provided between the first light filter 121, the second light filter 123 and the photosensor array 127, as shown in FIG. 12. Preferably, the light beam in FIG. 11 or FIG. 12 should approach the photosensor array at approximately normal incidence.

For a high finesse system, where the finesse $F = \pi R^{\frac{1}{2}}/(1-R) >> 1$, the intensity reflection coefficient $I_r$ will generally be close to 1 except adjacent to wavelengths for which $\sin \beta/2 = 0$, where $I_r = 0$ and the spacer thickness $h_2(x)$ and the light wavelength $\lambda_c$ are related by Eq. (7). Where the reflection mode is used, then, it may be preferable to use a combination of a high pass edge filter and a low pass edge filter to provide an intensity reflection coefficient $I_r$ that is sharply peaked at a sequence of wavelengths (for fixed spacer stratum thickness) or at a sequence of spacer stratum thicknesses (for constant wavelength), as discussed in connection with FIGS. 13A, 13B, 13C and 13D.

Figure 13A:
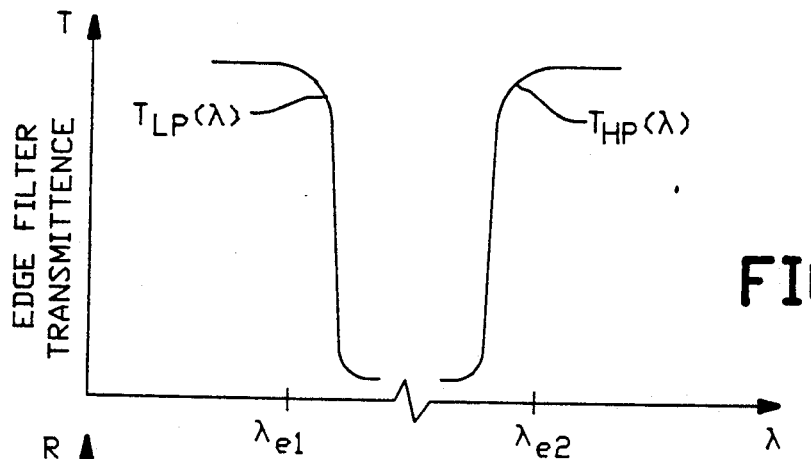
FIGS. 13A, 13B, 13C and 13D are plots illustrating light transmission through a high pass edge filter, a low pass edge filter, and combinations of these two filters, as used in the invention.
Figure 13B:
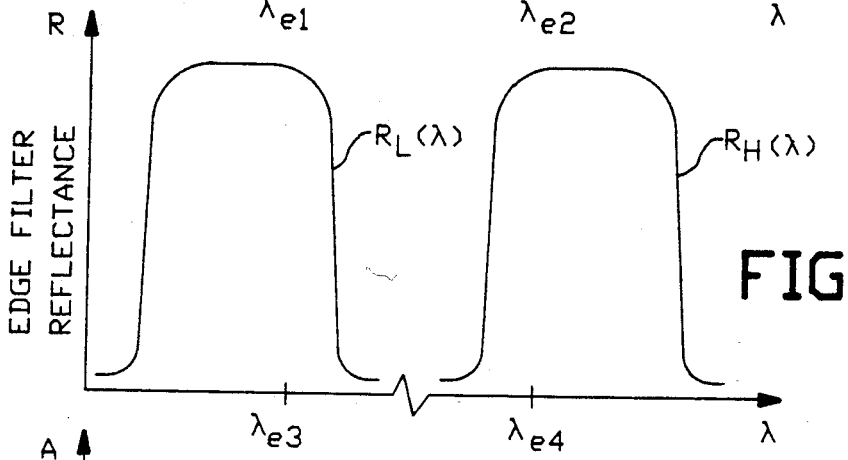
Figure 13C:
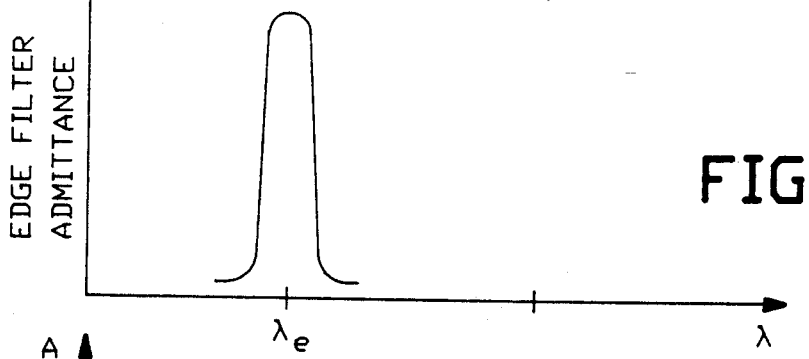

The filters shown in FIGS. 8, 10, 11 and 12 may be replaced by compound edge filters to produce a narrow band of reflected (or transmitted) wavelengths, as illustrated in FIGS. 13A and 13C, or a narrow band of reflected (or transmitted) wavelengths, as illustrated in FIGS. 13B and 13C. In FIG. 13A, the variation of light wave transmission $T_{HP}(\lambda)$ through a high pass edge filter and transmission $T_{LP}(\lambda)$ through a low pass edge filter are each shown as a function of wavelength $\lambda$. The low pass transmission filter has a "knee" wavelength $\lambda = \lambda_{e1}$, for which $\lambda \leq \lambda_1$ insures that $T_{LP}(\lambda)$ is near its maximum value; and for $\lambda > \lambda_{31}$ and increasing, $T_{LP}(\lambda)$ falls rapidly to approximately zero. The high pass transmission filter has a knee wavelength $\lambda = \lambda_{e2}$, for which $\lambda \geq \lambda_{e2}$ insures that $T_{HP}(\lambda)$ is near its maximum value; and for $\lambda < \lambda_{e2}$ and decreasing, $T_{HP}(\lambda)$ falls rapidly to approximately zero, as illustrated in FIG. 13A. If the low pass and high pass transmission filters are chosen so that $\lambda_{e1} \cong \lambda_{e2}$, the serial combination of these two filters will provide a composite transmission filter with an issuance $I(\lambda)$ (here, issuance refers to transmittance) that has a sharply peaked, narrow pass band at a central wavelength $\lambda_c = \lambda_{e1} = \lambda_{e2}$, as illustrated in FIG. 13C.

In FIG. 13B, the variation of light wave reflectance $R_L(\lambda)$ from a low end band pass edge filter and reflectance $R_H(\lambda)$ from a high end band pass edge filter are each shown as a function of $\lambda$. The low end reflection filter has a knee wavelength $\lambda = \lambda_{e3}$, for which $\lambda < \lambda_{e3}$ insures that $R_L(\lambda)$ is near its maximum value; and for $\lambda > \lambda_{e3}$ and increasing $R_L(\lambda)$ falls rapidly to approximately zero, as shown in FIG. 13B. The high end reflection filter has a knee wavelength at $\lambda = \lambda_{e4}$, for which $\lambda > \lambda_{e4}$ insures that $R_H(\lambda)$ is near its maximum value; and for $\lambda < \lambda_{e4}$ and decreasing $R_H(\lambda)$ falls rapidly to approximately zero, as illustrated in FIG. 13B. If the low end and high end reflection filters are chosen so that $\lambda_{e3} \approx \lambda_{e4}$, the serial combination of these two filters will provide a composite reflection filter with an issuance $I(\lambda)$ (here, issuance refers to reflectance) that has a sharply peaked, narrow pass band at a central wavelength $\lambda_3 = \lambda_{e3} = \lambda_{e4}$, as illustrated in FIG. 13C.

Figure 13D:
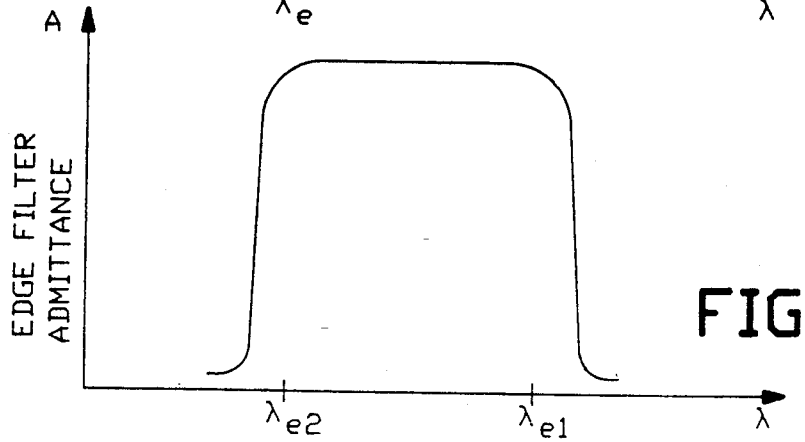

In FIG. 13D, the two knee wavelengths $\lambda_{e1}$ and $\lambda_{e2}$ from FIG. 13A are spaced further apart, and the result is a broad band pass filter as shown.

In each of the other embodiments discussed below, although the transmission mode of operation is discussed the invention may also be operated in the reflection mode, by analogy to FIGS. 10, 11, 12, 13A, 13B, 13C and 13D and the above discussions thereof.

Figure 14:
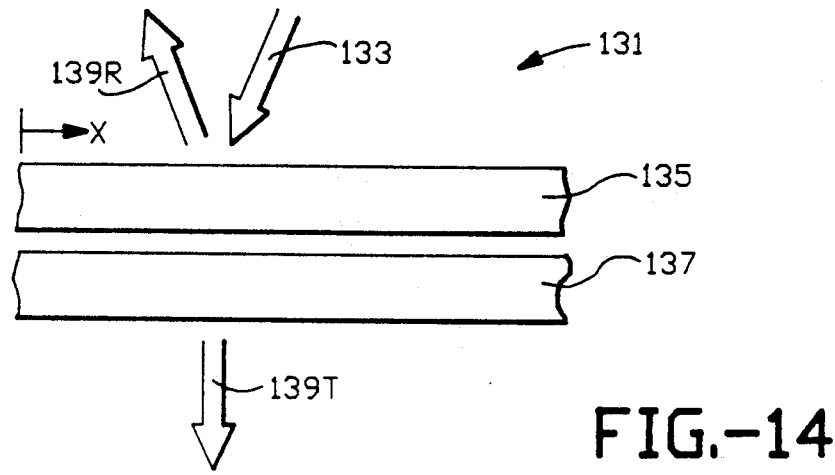
FIG. 14 is a side view of an embodiment that uses a serial combination of a high pass edge filter and a low pass edge filter

(5) With reference to an embodiment 131 of the filter shown in FIG. 14, if a light beam 133 is passed serially through a high pass edge filter 135 and through a low pass edge filter 137, both variable wavelength filters, in either order, in the embodiment 131, and if the two edge filter knee wavelengths are related as discussed in connection with FIGS. 13A and 13B, the desired light beam 139T (transmitted mode) or 139R (reflected mode) that emerges from the edge filter combination will have a band of wavelengths centered approximately at a wavelength $\lambda_c(x)$ that varies monotonically with the coordinate x. For fixed position x, the reflected intensity of the beam 139R (or transmitted intensity of the beam 139T) issuing from the combination of two edge filters shown in FIG. 14 will resemble the intensity shown in FIG. 9.

In another embodiment of the filter, an incident light beam may be directed to a broad band pass filter, constructed with variable central wavelength $\lambda_c$ according to any of FIGS. 8, 10, 11, 12 or 14 or with a fixed broad pass band, and the resulting transmitted or reflected light beam may then be directed to a narrow band wavelength filter with variable central wavelength $\lambda_c$ that is also constructed in accordance with one of these Figures. The serial arrangement of the broad band pass filter and narrow band pass filter, in either order, would be similar to the serial arrangement of two edge filters shown in FIG. 14. The broad band pass wavelength filter will remove wavelengths from all nearby pass bands from the incident light beam except the desired central band wavelengths so that no fringes appear in the light beam that issues from the combined filters.

Figure 15:
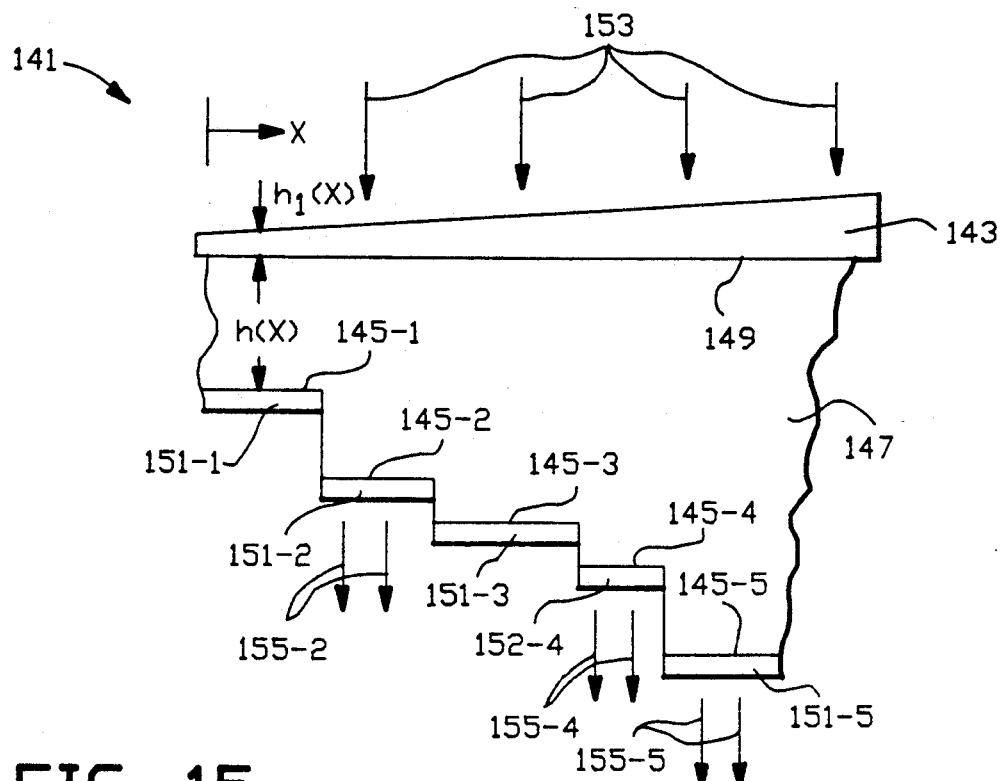
FIGS. 15 and 16 are side views of other embodiments of the invention in which one of the planar reflecting layers is replaced by a reflecting layer having a staircase configuration.

(6) FIG. 15 illustrates another embodiment 141 of the filter, which includes a filter stratum 143 of variable thickness, another reflecting surface that is arranged in a staircase configuration and consists of a sequence of planar staircase segment surfaces 145-1, 145-2, 145-3, 145-4 and 145-5, and a staircased filter stratum 147, which may be a vacuum or may be a material medium, positioned between the filter stratum 143 and the reflecting surfaces 145-q. Each staircase segment surface 145-q (q=1,2,3,4,5) is planar and is spaced apart from and approximately parallel to the plane of a first reflecting surface 149 of stratum 143, with a distance of separation h(x) between a nearest reflecting surface of the stratum 143 and a staircase reflecting surface 145-q that is constant for a small range of the coordinate x. The distance h(x) is increasing monotonically with the spatial coordinate x measured in a selected direction in a light-receiving plane of the stratum 143. Each staircase segment 145-q optionally has a filter layer 151-q (q=1,2,3,4,5) deposited on or adjacent to the front or back reflecting surface of the staircase segment. The filter stratum 147 behaves as a narrow band pass light filter with variable spacer layer thickness h(x). The stratum 143 serves as a wide band pass filter whose thickness may be constant or may be monotonically increasing with x. In another embodiment, the stratum 143 may serve as a narrow band pass filter and the filter stratum 147 may serve as a broad band pass filter, with each staircase segment 145-q defining a different broad pass band for the device.

An incident light beam 153 is partly transmitted through the stratum 143 and through the staircased filter stratum 147 and emerges as a transmitted light beam 155-q (q=2,4 and 5 are shown in FIG. 15) that exhibits interference effects similar to those discussed above in connection with FIGS. 8 and 9. The interference effects vary by small increments from one staircase segment to the next; but within a given staircase segment the system behaves as a variable wavelength filter similar to that of FIG. 8. The strata 143 and 147 may be contiguous or may be spaced apart from one another.

Figure 16:
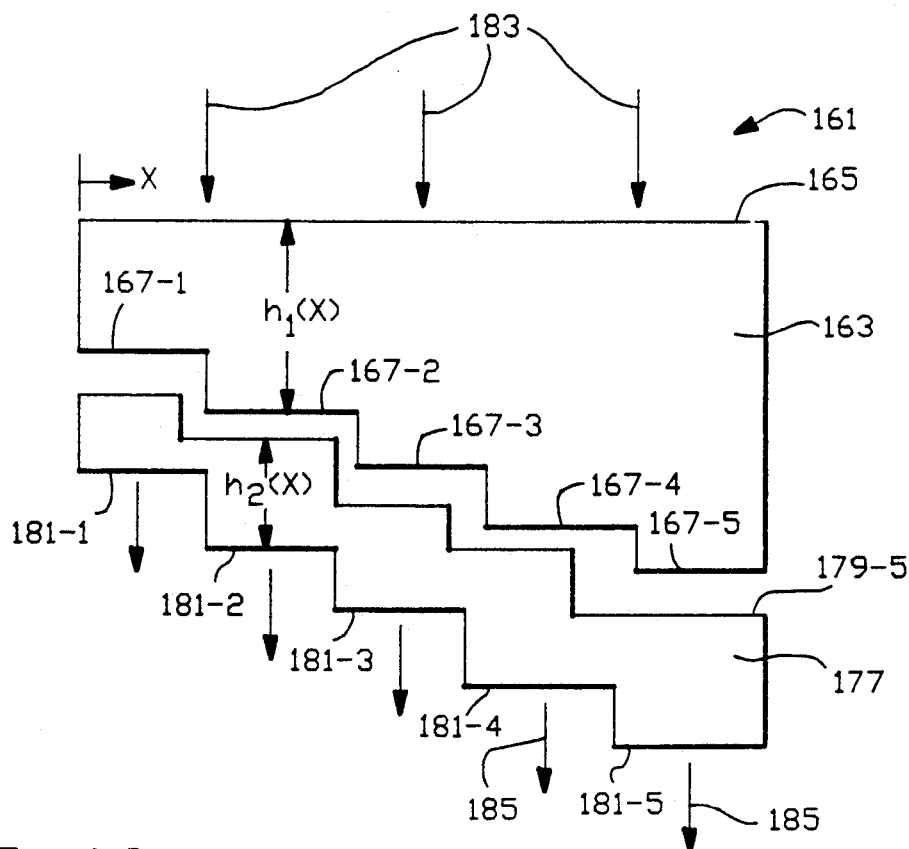

(7) In an alternative embodiment 161 of the filter, shown in FIG. 16, a first filter or spacer stratum 163 has a first reflecting surface 165 that is approximately planar and has a second reflecting surface 167-q (q=-1,2,3,4,5) that is formed in a staircase configuration with a monotonically increasing distance of separation $h_1(x)$ between the surfaces 165 and 167-q. A second filter or spacer stratum 177 has a second staircase configuration surface 179-q as a first reflecting surface and has a third staircase configuration surface 181-q as a second reflecting surface, with the distance of separation $h_2(x)$ between two corresponding surfaces 179-q and 1-q being monotonically increasing in x. One of the two filter strata 163 and 177 serves as a narrow band pass filter, and the other stratum serves as a wide band pass filter. An incident light beam 183 passes through both filter strata 163 and 177 and issues from the embodiment 161 as a sequence of light beamlets 185, each with a narrow wavelength range. The filter strata 163 and 177 may be contiguous or may be spaced apart from one another.

A "staircase configuration", as used herein, will refer to a configuration similar to that illustrated in FIG. 15 or FIG. 16, where a sequence of two or more planar reflecting segments is arranged so that each segment is approximately parallel to a given plane (for example, a plane of the strata 143 in FIG. 15), and the distance of separation of the sequence of staircase segments from the given plane increases monotonically as one proceeds consecutively from one segment to the next. The filter stratum 177 in FIG. 16 has two reflecting surfaces 179-q and 181-q, each of which is formed in a staircase configuration.

Figure 17A:
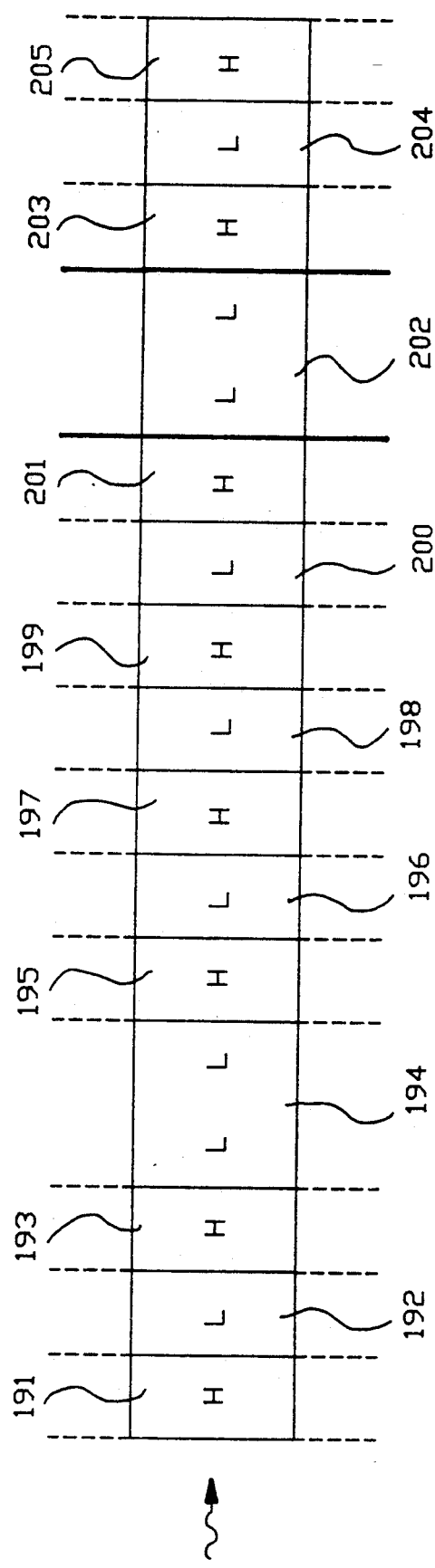
FIGS. 17A and 17B are cross-sectional views of two versions of a multilayer thin film filter configuration suitable for implementing an embodiment of the invention.
Figure 18A:
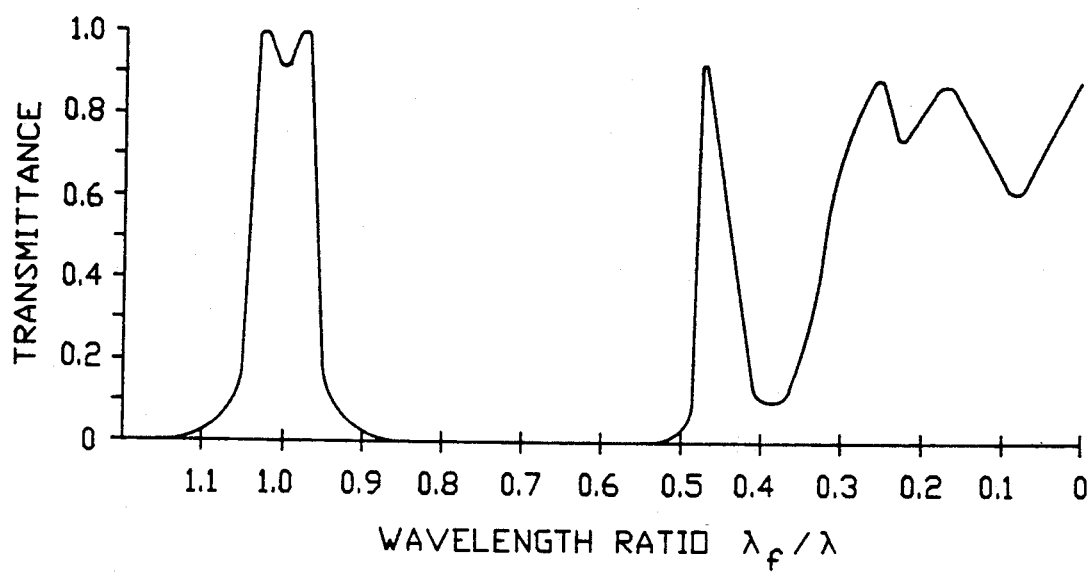
FIGS. 18A and 18B are plots of transmittance versus inverse wavelength for two thin film filters implemented according to the invention.
Figure 18B:
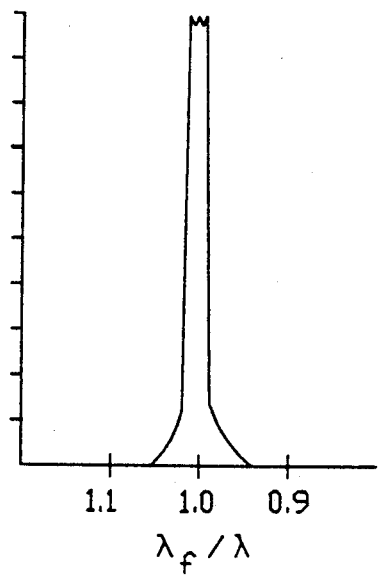

(8) Normally, a tradeoff must be made between narrowness of the wavelength pass band and transmission. McLeod, in his treatise *Thin-Film Optical Filters*, op. cit., pp. 270–276, discusses the use of a multi-layer thin film light filter to produce a very narrow, approximately rectangularly shaped optical transmission band with adequate transmission. FIG. 17A illustrates construction of one embodiment of a double half wave ("DHW") thin film filter that will provide such a band. For a fixed wavelength $\lambda_f$, a plurality of optically transparent layers of alternating high (H) and low (L) refractive indices $n_H$ and $n_L$, respectively, are positioned contiguously as shown. High index layers (H) 191, 193, 195, 197, 199, 201, 203 and 205 are each quarter wave plates for the high index $n_H$. Low index layers (L) 192, 196, 198, 200 and 204 are each quarter wave plates for the low index $n_L$. Low index layers 194 and 202 are each half wave plates and thus function as Fabry-Perot eta- Ions. Each of these two etalons 194 and 202 has substantially 0 percent reflectance and substantially 100 percent transmittance at the center wavelength $\lambda = \lambda_f$. However, the reflectance quickly rises toward 100 percent on either side of the valley at wavelength $\lambda = \lambda_f$. In a multilayer thin film embodiment of the invention, the two half wave plate layers such as 194 and 202 would each have a thickness that varies monotonically along a selected direction in a plane of the film. The computed transmittance of the thin film configuration shown in FIG. 17A, for the choices of refractive indices $n_H = 2.40$ ($TiO_2$) and $n_L = 1.45$ (quartz), is shown in FIG. 18A (similar to FIG. 7.14 of McLeod, op. cit.) as a function of the wavelength ratio $g = \lambda_f/\lambda$($\lambda$ variable). The computed transmittance has a moderate width peak with a steeply rising or steeply falling curve at $|1 - \lambda_f/\lambda| \approx 0.05$ and some side band structure for $\lambda > 2\lambda_f$. FIG. 18B illustrates the computed transmittance of a configuration similar to that of FIG. 17A in which the two half wave plate layers are of high refractive index material rather than low refractive index material, another suitable embodiment of the invention.

One embodiment of the filter uses a first multilayer film filter stack with approximately constant reflectance over the wavelength band of interest and a second multilayer thin film filter stack in which the reflectance increases rapidly from a very low value in a narrow wavelength band (positioned at a central wavelength $\lambda_c$) to a much higher reflectance value just outside this narrow band. The wavelength $\lambda_c$ is determined by a thickness $h_2(x)$ of a layer in the second film stack, and the thickness $h_2(x)$ is caused to increase monotonically with increase of a spatial coordinate x in a selected direction in the light-receiving plane of the filter. Serial combination of the first and second thin film filter stacks produces a very narrow band filter, centered at a wavelength $\lambda_c$ that varies monotonically with position x in the selected direction. These two filter stacks are serially combined with a wide band pass filter (not shown in FIG. 17A) that is transmitting at wavelength $\lambda = \lambda_c$, in order to remove any undesirable side band structure and produce a single narrow band pass filter with a central wavelength $\lambda_c$ that increases monotonically with change in position in a selected direction in a light-receiving plane of the filter.

Figure 17B:
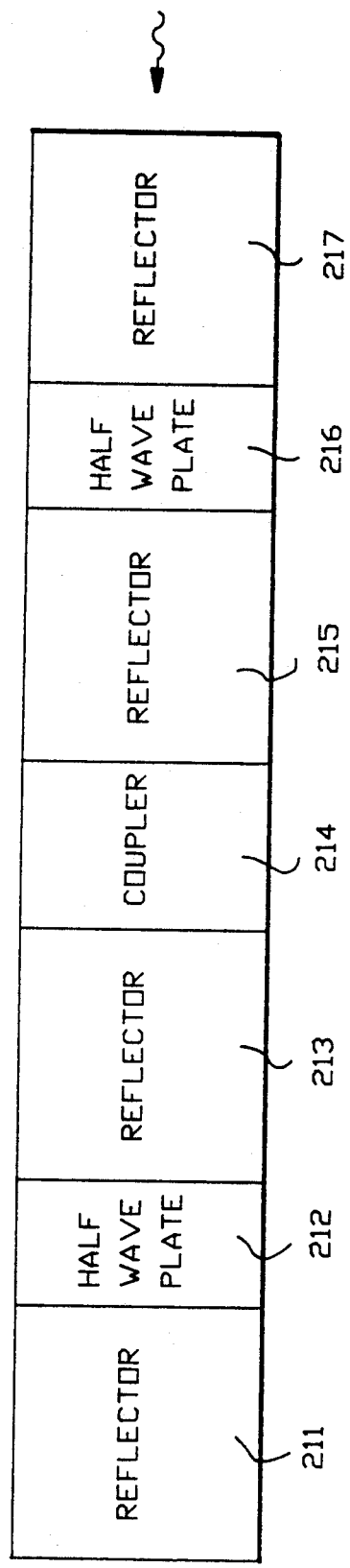
Figure 19:
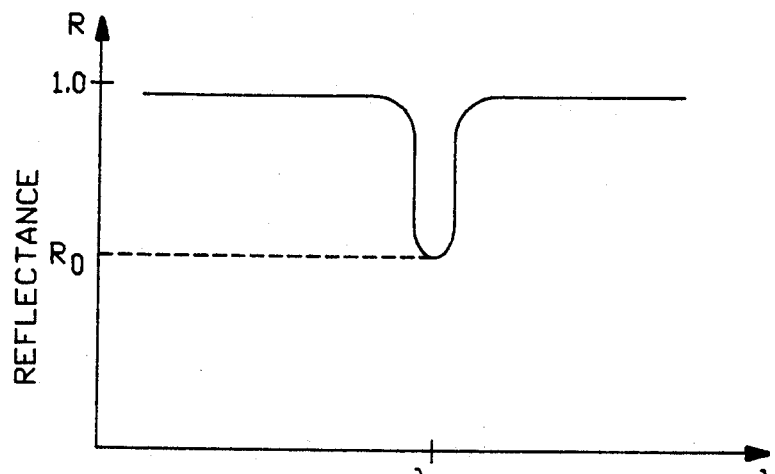
FIG. 19 is a plot of reflectance of a light beam as a function of wavelength for the embodiment shown in FIG. 17B.

With reference to FIGS. 17A and 17B, the quarter wave plates 191, 192, 193 serve as a first reflector 211; the plates 195, 196 and 197 serve as a second reflector 213; the plates 199, 200 and 201 serve as a third reflector 215; the plates 203, 204 and 205 serve as a fourth reflector 217; the double thickness plates 194 and 202 serve as half wave plates 212 and 216; and the plate 198 serves as an optical coupler in the embodiment 224 shown in FIG. 17B. The optical coupler is optional and may be deleted here. The combination of the reflectors 211 and 213 and the half wave plate 212 as shown in FIG. 17B provides a special reflector whose light reflectance R as a function of wavelength $\lambda$ is illustrated in FIG. 19. The reflectance has a high value, near 1.0, over most of the range of the wavelength $\lambda$, except for a narrow wavelength interval centered at $\lambda = \lambda_f$, where the reflectance drops sharply to a lower value $R_0$. The special reflector consisting of the elements 211, 212 and 213 in FIG. 17B, may be used by itself or may be concatenated with other, similar special reflectors, with or without optical couplers 214 interposed, to provide a narrow, sharply peaked transmittance T ($\approx 1 - R$) at the selected wavelength $\lambda = \lambda_f$.

A multi-layer thin film filter that produces the desired narrow, sharp peaks in reflectance or transmittance is not limited to the configuration shown in FIG. 17A. The half wave plates 194 and 212 may consist of high refractive index material, or the positions of the high and low index materials may be exchanged, or both of these changes may be made. Further, each of the four groups of quarter wave plates (191, 192, 193), (195, 196, 197), (199, 200, 201) and (203, 204, 215) shown in FIG. 17A may each be replaced by an odd number (1,3,5,7,9, ...) of quarter wave plates of alternating refractive index (high/low) material. An example of this is shown in FIG. 20, in which four quarter wave plates 221, 223, 225 and 227 of low index serve as reflectors, two double thickness plates 222 and 226 of high index serve as half wave plates, and a quarter wave plate 224 of high index serves as an optical coupler, analogous to the arrangement shown in FIG. 17B.

Figure 20:
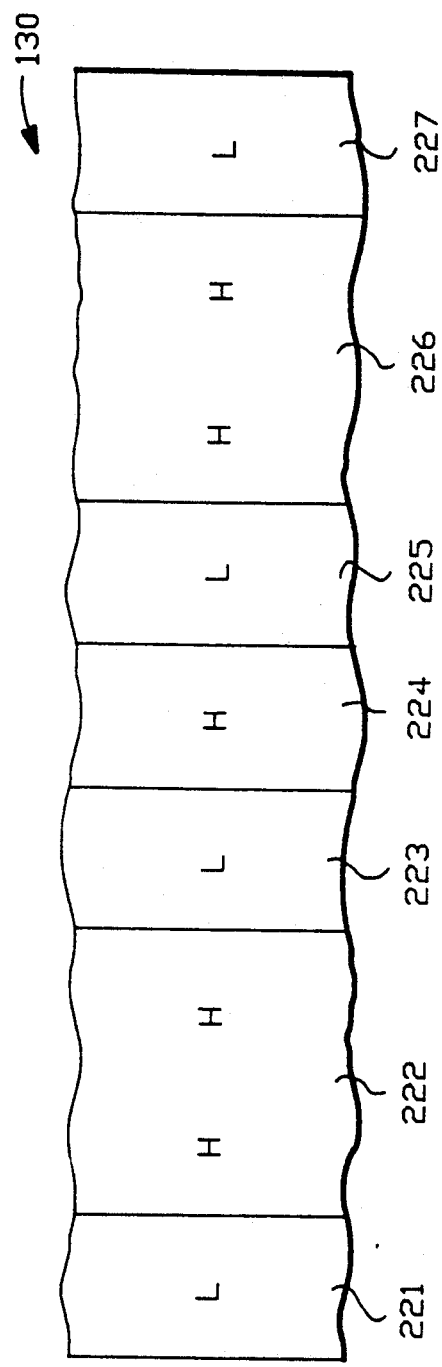
FIG. 20 is a cross-sectional view of another multilayer thin film filter constructed according to the invention.

Reduced to its minimum, a multi-layer thin film filter, of the type shown in FIGS. 17A, 17B or 20, that produces a narrow, sharp peak in transmittance or reflectance requires $N_1$ ($\geq 4$) quarter wave plates of high (or low) refractive index alternating with $N_1 - 1$ (or $N_1 - 2$) wave plates of low (or high) refractive index, where $N_1 - 3$ of these latter $N_1 - 1$ plates quarter wave plates and the remaining two of these plates are half wave plates. In another embodiment, represented by the wave plates 221, 222 and 223 in FIG. 20, a suitable multi-layer thin film filter requires $N_2$ ($\geq 2$) quarter wave plates of high (or low) refractive index alternating with $N_2 - 1$ plates of low (or high) refractive index, where one of these $N_2 - 1$ plates of low (or high) index is a half wave plate and the remaining $N_2 - 2$ such plates are quarter wave plates. In either of these configurations, each half wave plate has variable thickness.

Thin film optical layers are most commonly manufactured by vacuum deposition. In this process, each thin film is condensed from the vapor phase onto the substrate in a vacuum chamber. The substrate is held at a temperature somewhat below the solidification temperature of the film. A variety of techniques are used to vaporize the film material. These include ion bombardment (sputtering), thermal evaporation, electron beam bombardment and other techniques.

The non-constant separation distance h(x) of two substrates, two surfaces of a single substrate, or two surfaces of a single filter layer, should preferably vary continuously, with the exception of the staircase configurations shown in FIGS. 15 and 16. The shape function h(x) may vary linearly with x or may vary non-linearly with x, for example as $a + bx^k$ with $k < 1$, $k = 1$ or $k > 1$, as illustrated in the curves 231, 233 and 235, respectively, in FIG. 21.

Figure 21:
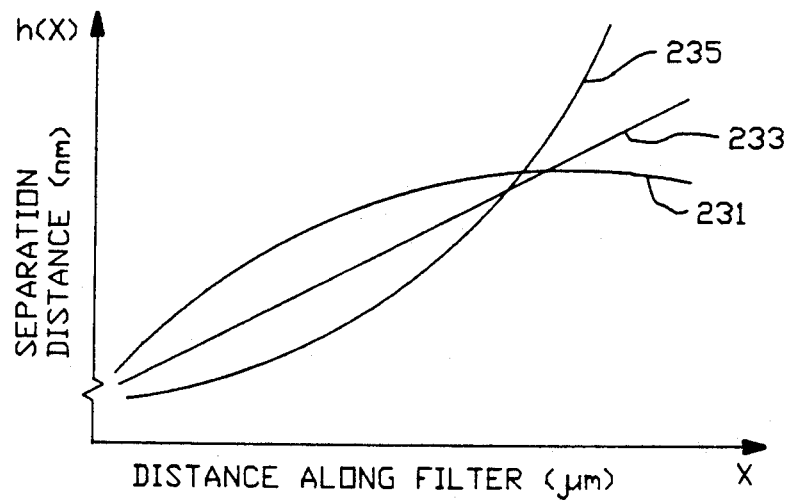
FIG. 21 is a plot of several possible variations with distance x of the separation distance h(x) of two adjacent reflecting surfaces within the filter in a selected direction.

For $k = 1$ in FIG. 21, a sequence of uniform width wavelength intervals will correspond to uniform widths on the variable wavelength filter. For $k > 1$, these wavelength intervals will have greater width at the low wavelength end than at the high wavelength end of the filter. This configuration would be useful where the light is to be dispersed more broadly at the low wavelength end and will cause the filter to transmit a smaller amount of light per unit length at the low wavelength end of the filter, as compared to the high wavelength end. For $k < 1$ the conditions are reversed, and the filter disperses light less at the low wavelength end. This configuration is useful if, as usually occurs, the photosensors used have reduced sensitivity to light at lower wavelength (for example, at $\lambda \approx 400$ nm) so that more light reception is needed for each photosensor at the low wavelength end. The separation distance h(x) is not limited to functions of the form $a+bx^k$. Exponential, trigonometric, logarithmic and other similar shape functions h(x) may also be used here.

Figure 22:
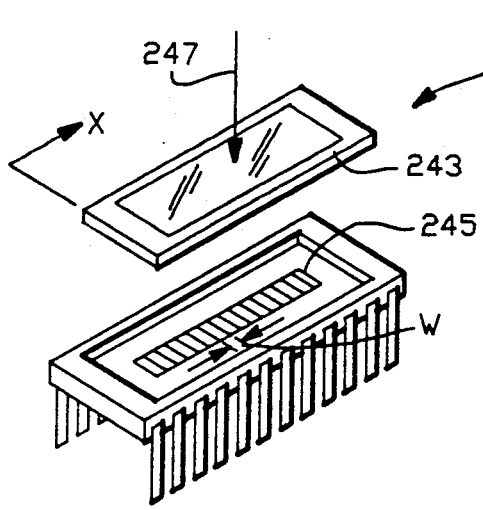
FIGS. 22 and 23 are perspective views showing the use of one filter or two filters laid end-to-end, respectively, according to the invention, together with an array of photosensitive elements.

FIG. 22 illustrates the use of the wavelength filter in spectrophotometer apparatus 241 that can be contained on a single semiconductor chip if desired. A spectrophotometer filter 243, fabricated in accordance with any of the embodiments discussed herein, is positioned so that it overlies and is adjacent to a linear array 245 of photosensor elements extending in the selected direction. Each photosensor element has a finite width w that may be of the order of 50 μm or less so that the linear array 245 of photosensor elements has a finite number of such elements present. Each of these photosensor elements receives a transmitted (or reflected) portion of an incident light beam 247 that issues from the filter 243 for a small interval $x_0-w/2 \leq x \leq x_0+w/2$ of the spatial coordinate x, where $x_0$ is the central value of x in this interval. The wavelength increment per photosensor element is as small as $\Delta\lambda_c = 1$ nm (nanometer) or as large as one wishes in one embodiment of this invention. Thus, the result of the interference effects will differ from one photosensor element to an adjacent element, and the wavelength(s) corresponding to a peak of transmitted intensity will also vary from one photosensor element to the next. Used in this manner, the linear array 245 of photosensor elements will distinguish between wavelengths on the basis of different peak wavelengths that are present in the narrow wavelength interval or portion of the light beam received by each photosensor element.

Photosensors suitable for the present invention are well known in the art and readily available commercially. The devices are offered in single and two dimensional arrays over a variety of photoelement aperture sizes, spectral sensitivity ranges, signal transfer techniques and package configurations. The linear, area and circular silicon photodiode arrays produced by EG&G Reticon Corp., Sunnyvale, California are representative devices for applications operating over the near ultraviolet to near infrared spectral range. These devices have relatively large photoelement areas, e.g. 50 microns by 100-2500 microns and are well suited for spectroscopic applications. Typical commercial array sizes are 128 to 2048 elements in a linear array, 256 by 256 elements to 64 by 2048 elements in an area array, and 64 to 720 elements in circular arrays. The photoelements are typically processed on a ceramic substrate and housed in a standard dual in-line package that is pin-compatible with integrated circuit sockets. Photoelements made of different materials can be used to extend photosensitivity to, or to alter photosensitivity in, other spectral ranges. For example, HgCdTe and InSb are often used in infrared sensors. Suitable photosensor materials for differing spectral ranges are well known and are discussed in L. R. Masten, "*Understanding Ootronics*", Texas Instruments Learning Center, 1981, Chaps. 3, 4 and 7.

In a simple construction of the spectrophotometer, the filter substrate or a set of filter substrates is mounted to the surface of the photoelement package. To minimize the spacing between the photoelement array and the filter, the filter and sensor may be coupled optically through a fiber face plate. Sensors prefabricated with fiber face plates are offered commercially by EG&G Reticon, op. cit. The fiber face plate and minimized spacing reduce the possibility of bandpass broadening with high numeric aperture light incidence.

The projection of light on the photosensor face may be facilitated by use of a lens or lenses located on the object or image side of the filter substrate or substrates. For example, a projection lens can be mounted between the filter and sensor so that the filter and sensor are separated by some distance as shown in FIG. 22B, discussed below. In this configuration, the active dimension of the filter becomes related to the active dimension of the sensor through the magnification of the lens. In this manner, a relatively small dimension filter can be projected to a relatively large dimension sensor for increased resolution. Alternatively, a large dimension filter can be projected to a small dimension sensor for increased light sensitivity or economy.

Figure 24:
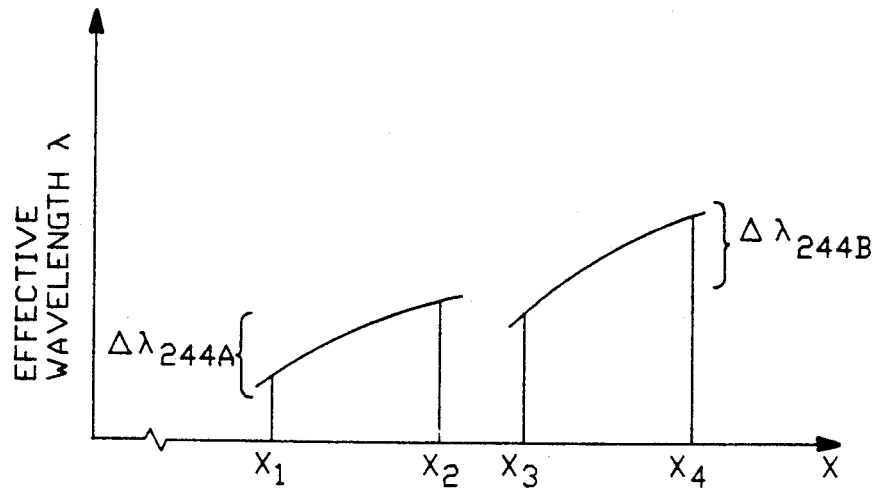
FIG. 24 is a plot illustrating partial overlap of selected wavelength bands versus spatial displacement of two filters constructed according to the invention in FIG. 23.
Figure 23:
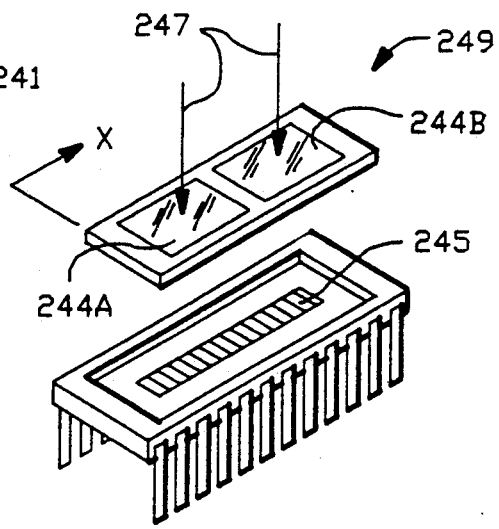

FIG. 23 illustrates an embodiment 249 that includes two or more filters 244A and 244B to each receive and transmit a portion of a light beam 247, with each such filter having a non-overlapping or partially overlapping wavelength interval for which that filter is effective, and one or more photosensor arrays 245. This allows a single spectrophotometer to cover an increased wavelength range of any reasonable size with a single instrument, including the visible region and portions of the ultraviolet and infrared regions if desired. FIG. 24 illustrates the partial overlap of two wavelength intervals, denoted $\Delta\lambda 244A$ and $\Delta\lambda 244B$, for the two adjacent filters 244A and 244B in FIG. 23, the first filter being effective for the coordinate range $x_1 \leq x \leq x_2$ and the second filter being effective for the coordinate range $x_3 \leq x \leq x_4$ where $x_1 < x_2 < x_3 < x_4$.

Figure 25:
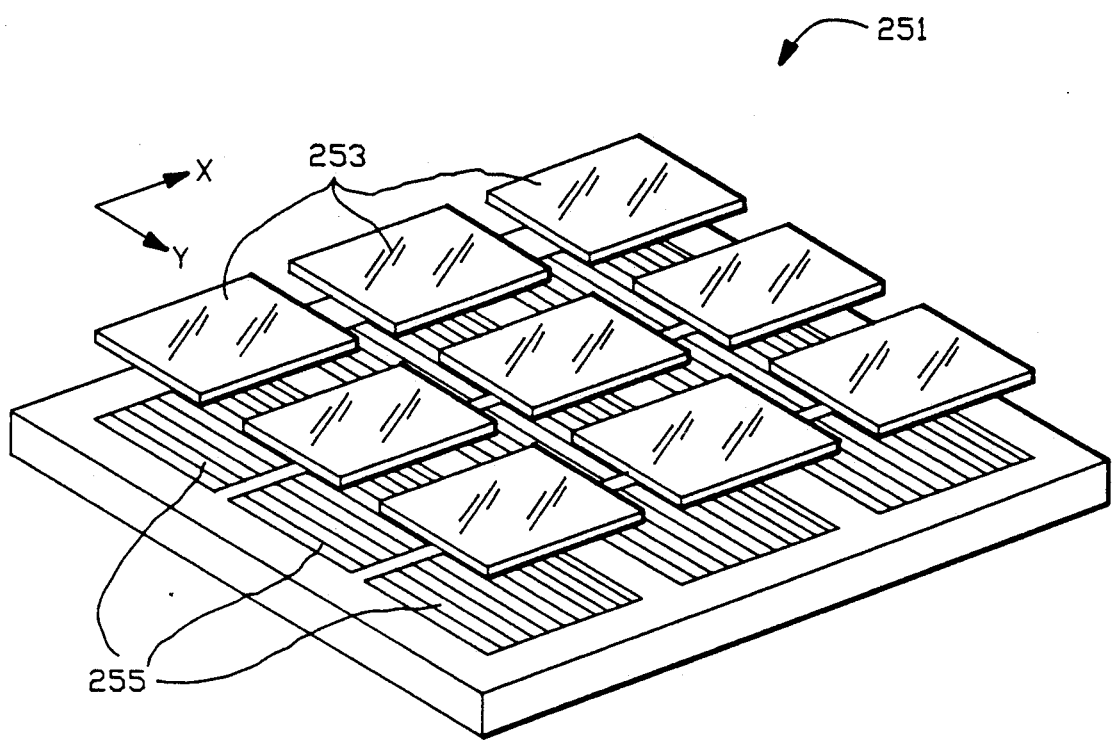
FIG. 25 is a perspective view of an embodiment that utilizes a two-dimensional array of filters and photosensors.

FIG. 23 illustrates the use of two or more light filters and photosensor arrays in an end-to-end configuration 249. An array of light filters 253 and an array of photosensors 255 can also be combined in a side-by-side configuration or in a two-dimensional array and embodiment 251 as shown in FIG. 25. In the two-dimensional array shown in FIG. 23, a central wavelength $\lambda_c(x,y)$ could vary continuously and monotonically with the coordinate x and could vary monotonically, either continuously or by discrete amounts, with the coordinate y, measured in a direction perpendicular to the x direction.

Figure 26A:
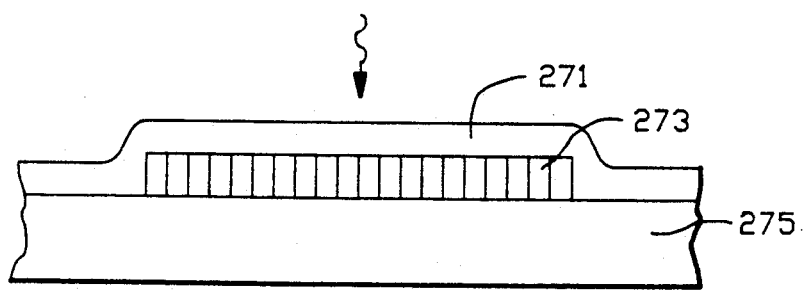
FIGS. 26A, 26B and 26C are side views of three embodiments that allow a wavelength filter and a photosensor array to be positioned contiguous to one another, according to the invention.
Figure 26B:
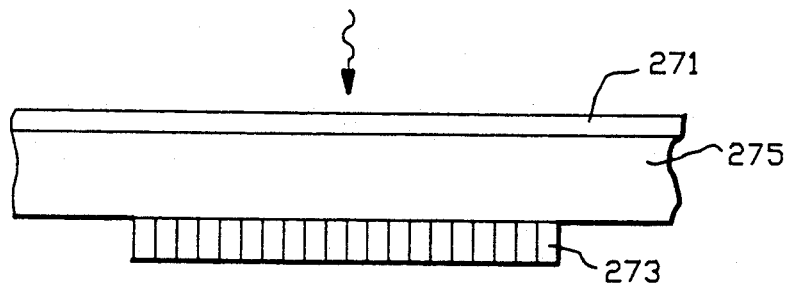

FIGS. 26A and 26B illustrate two embodiments that allow a VWF 271 and a photosensor array 273 to reside on a common substrate 275, with the VWF 271 and the photosensor array being positioned on the same side of the substrate 275 in FIG. 26A and being positioned on opposite sides of the substrate in FIG. 26B. Several sensor processes allow deposition of photosensitive material and driving circuits on glass substrates. One such process is described by Shinji Morozumi, et al., in "Completely Integrated a-Si:H Linear Image Sensor with Poly Si T.F.T Drivers", Extended Abstracts of the 16th (1984 International) Conference on Solid State Devices and Materials, Kobe, 1984, pp. 559-562. The sensor is constructed by depositing poly-silicon thin film transistor switches and amorphous silicon diodes on glass. Photodiode array sensors on glass substrates are offered commercially by Ovonic Imaging Systems, Troy, Mich., Suwa Seikosha Co., Ltd., Japan, and others. The ability to deposit both filter and sensor on silicon dioxide (quartz or glass), and further, the ability for one of the multicomponent layers of the filter to be silicon dioxide, allows the filter and sensor to share a common substrate, sharing opposite sides of the substrate, or deposited, one over the other, on a common side of the substrate.

Figure 26C:
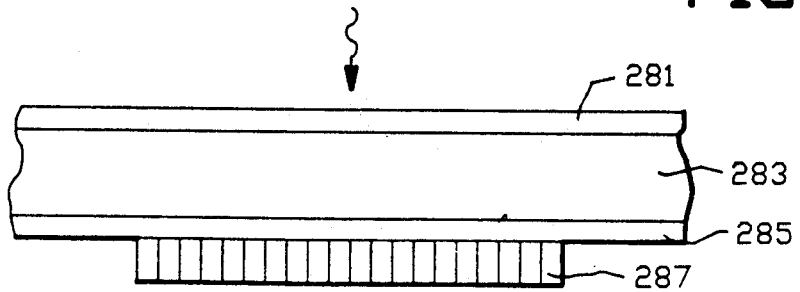

In the embodiment of FIG. 26C, a broad band pass VWF 281 is positioned on another light-receiving surface of the substrate 283 from a narrow band pass VWF 285 and a photosensor array 287. Alternatively, a broad band pass filter material may be incorporated with the substrate 283 so that no additional stratum or layer 281 is required, as suggested in FIGS. 26A and 26B. In this instance the substrate may be a "colored glass" that transmits light wavelengths only within a pass band of modest width. For example, colored glass of Schott glass type UG1 and UG11 is available from Melles Griot that transmits only in the wavelength bands 275 nm$<\lambda<$405 nm and $\lambda>$680. nm (for UG1) and 240 nm$<\lambda<$395 nm and 660 nm$<\lambda<$800. nm (for UG11).

Preferably, the filter shown in any of FIGS. 8, 10–17, 21, 22 and 25 includes: (1) a broad band pass filter that attenuates any light of wavelength lying outside a sharply defined pass band including a central wavelength $\lambda=\lambda_c$ and (2) a narrow band pass filter that has a central wavelength $\lambda=\lambda_c$ lying in the narrow pass band, with any other multiples or side bands of this wavelength for which the narrow pass band filter is transmitting being heavily attenuated by the broad band pass filter. The narrow band pass filter and, optionally, the broad band pass filter, will have central wavelengths $\lambda=\lambda_c$ that vary with position x along the filter.

The present invention is intended to cover computer peripheral input and output devices, such as monitors, printers, scanners and networks, and other image input-/output devices such as film recorders and digital and analog cameras. Computer workstations, and networks thereof, may be individually color calibrated and may communicate device-independent color data between themselves, using the invention disclosed here. The colorimeter and color calibration system may also be used to match colors or determine the colorant content of paints, inks, body fluids (blood, urine, etc.), dyes, fabrics, plastics and other colored liquids and solids. In these applications, the tri-stimulus data from the colorimeter is used to monitor and/or control two or more color constituents that are combined in the end product. The colorimeter and color calibration system disclosed here may also be constructed as a stand-alone instrument for industrial, commercial, medical and analytical color measurement. Using only one color component, such as brightness or luminance L, the invention may also serve for gray scale calibration or photometry.

I claim:

1. A color measurement device for determining the color composition of a small predetermined area at an arbitrary position on an object having an exposed surface, the apparatus comprising:

a variable wavelength light filter having a light-receiving surface, to receive an incident light beam from the object, the light having a plurality of wavelengths in a selected wavelength band, and to disperse the beam into a plurality of four or more narrow, non-overlapping wavelength pass bands, each pass band having a wavelength width no more than 20 nm, with a central wavelength $\lambda_c(x)$ that increases monotonically with an increase of a position coordinate x measured in a selected direction lying on the light-receiving surface;

light restriction means that defines a small predetermined area for receiving and admitting light from a restricted portion of the object and for directing this light to the light-receiving surface of the light filter, where the light restriction means comprises a window that approximately coincides with the small predetermined area and has a first area transparent to light in the selected wavelength band and has a second area surrounding the first area that is substantially opaque to light in the selected wavelength band;

an array of photosensors, positioned to receive light that is transmitted through or reflected from the light filter so that each photosensor in the array receives light in a very narrow band of wavelengths having the central wavelength $\lambda_c(x)$ and having a wavelength width no more than a wavelength width of a pass band of the light filter, for light received or transmitted at the position with coordinate x on the light filter, with each photosensor in the array issuing an output signal that represents the cumulative light energy received by that photosensor from the light filter; and color measurement means for receiving the photosensor output signals and for determining the color or colors present in the incident light based on the relative amounts of light of different wavelengths received at four or more of the photosensors.

2. The apparatus of claim 1, wherein said window includes a light-admitting area of controllably variable size.

3. The apparatus of claim 1, further comprising a mobile housing surrounding and containing said variable wavelength light filter, said photosensor array and said light restriction means, the housing being adapted for movement in one direction or in two independent directions across at least a portion of said exposed surface of said object and having position sensing means for sensing the present position of said light restriction means on the exposed surface.

4. The apparatus of claim 1, further comprising a light source that illuminates said small predetermined are of said object with light having wavelengths in said selected wavelength band when said color measurement device is placed at the arbitrary position on or adjacent to said object.

5. The apparatus of claim 4, wherein said photosensor array includes spectrum adjustment means for compensating for the wavelength distribution of light emitted by said light source relative to the wavelength distribution of a selected reference light source.

6. The apparatus of claim 5, wherein said spectrum adjustment means comprises:

spectrum memory means for receiving and storing a signal representing the intensity of light received from said light source in a wavelength interval corresponding to each of four or more of said photosensors, and for storing a signal representing the intensity of light received in each of these wavelength intervals from said reference light source;

compensation means for dividing the light intensity signal from said reference light source for each wavelength interval by the light intensity signal from said light source for the same wavelength interval to form a light intensity ratio for each of the wavelength intervals, and for storing this sequence of light intensity ratios; and multiplication means for receiving a light intensity signal from said object in the wavelength interval corresponding to each of four or more photosensors, for multiplying this light intensity signal by the light intensity ratio for that wavelength interval stored in the compensation means, and for issuing the resulting product signals as a sequence of compensated light intensity output signals for these wavelength intervals.

7. The apparatus of claim 1, further comprising position indicating means for visibly indicating said arbitrary position of said small predetermined area on said object.

8. The apparatus of claim 1, further comprising exposure adjustment means for receiving a cumulative light energy signal from at least one of said photosensors over a selected exposure time interval and for adjusting the exposure time interval of said photosensor to the light so that the cumulative light energy E received at that photosensor lies in a range given by $E_1 \leq E \leq E_2$, where $E_1$ and $E_2$ are two predetermined light energy values.

9. The apparatus of claim 1, further comprising intensity determination means for exposing a selected photosensor in said photosensor array to light that is transmitted through or reflected from said light filter for a predetermined time interval of length $\tau > 0$, and for dividing the accumulated light energy E received by the selected photosensor during an exposure time interval of length $\tau$ by $\tau$ to produce and issue a photosensor average light intensity light signal $I = E/\tau$ as an output signal.

10. The apparatus of claim 9, further comprising dark current compensation means for determining a dark current contribution $E_d$ to said accumulated light energy E for said exposure time interval length $\tau$, for determining a dark current compensation factor $K_d$, where $E_d$ and $K_d$ may depend upon said interval length $\tau$ and upon operating temperature T, so that the ratio $E_d(\tau,T)/K_d(\tau,T)$, representing an average time rate of dark current contribution to light intensity, is substantially constant as said length $\tau$ is varied or as the temperature T is varied, and for forming and issuing a compensated average light intensity signal $I' = (E/\tau - E_d(\tau,T)/K_d(\tau,T)$ as an output signal.

11. The apparatus of claim 1, further comprising convolution means having a memory, for storing three color tristimulus functions $x(\lambda)$, $y(\lambda)$ and $z(\lambda)$ that depend upon a central wavelength $\lambda$ of a light beam received, for receiving said photosensor intensity signals $I(\lambda)$, where each of said photosensor intensity signals depends upon said central wavelength $\lambda = \lambda_c(x)$, and for forming and issuing tristimulus convolution integral signals X, Y and Z defined by $$X = \int x(\lambda) I(\lambda) d\lambda,$$

$$Y = \int y(\lambda) I(\lambda) d\lambda,$$

$$Z = \int z(\lambda) I(\lambda) d\lambda,$$

12. The apparatus of claim 1, further comprising wavelength compensation means for receiving said photosensor output signals, for storing multiplicative compensation factors for each of said photosensor output signals that compensate for non-uniformity of response of each of said photosensors with variation with wavelength of said light that is received from said light filter and for multiplying said photosensor output signals by these compensation factors.

13. The apparatus of claim 1, wherein said variable wavelength light filter comprises:
a first stratum of light filter material having two spaced apart, light-receiving surfaces facing each other, that is partly transmitting and partly reflecting for light received on a light-receiving surface thereof, and having a light wavelength in a selected wavelength pass band, where the distance of separation of the two surfaces increases monotonically with displacement of position in the selected direction, and for at least one value of the position coordinate x the transmissivity or reflectivity of the first stratum is enhanced for light of a selected wavelength $\lambda_c(x)$ in the selected wavelength pass band; and a second stratum of filter material having two spaced apart, light-receiving surfaces facing each other, with a distance of separation of the two surfaces that varies monotonically with displacement of position in the selected direction, that has enhanced transmissivity or enhanced reflectivity for light having the wavelength $\lambda_c(x)$, that has substantially zero transmissivity or substantially zero reflectivity, as the case may be, for light having a wavelength approximately equal to a wavelength of any side band of the first stratum of filter material, and that is positioned so that light that is transmitted through or reflected from one of the first filter stratum and the second filter stratum is received by the other filter stratum.

14. The apparatus of claim 1, wherein said photosensor wavelength band has a wavelength width of no greater than 1.6 nm.

15. A color measurement system for monitoring and controlling the spectrum of colors presented by one or more computer peripheral devices controlled by a computer, the apparatus comprising:
a variable wavelength light filter having a light-receiving surface, to receive an incident light beam from the peripheral device, the light having a plurality of wavelengths in a selected wavelength band, and to disperse the beam into a plurality of four or more narrow, non-overlapping, wavelength pass bands, each pass band having a wavelength width no more than 20 nm and having a central wavelength $\lambda_c(x)$ that increases monotonically with an increase of a position coordinate x measured in a selected direction lying on the light-received surface;

light restriction means that defines a small predetermined area for receiving and admitting light from a restricted portion of the object and for directing this light to the light-receiving surface of the light filter;

an array of photosensors, positioned to receive light that is transmitted through or reflected from the light filter so that each photosensor in the array receives light in a very narrow band of wavelengths, with each such band having a central wavelength $\lambda_c(x)$ and having a wavelength width no more than the wavelength width of a pass band of the light filter, for light received and dispersed at the position with coordinate x on the light filter, with each photosensor in the array issuing an output signal that represents the cumulative light energy received by that photosensor from the light filter;

color measurement means for receiving the photosensor output signals and for determining the color or colors present in the incident light based on the relative amounts of light of different wavelengths received at four or more of the photosensors; and light calibration means for receiving the output signals from the photosensor array, for comparing the amount of light received by the photosensors in the array with a reference table of light values that should be received by each of the photosensors, or by a linear combination of at least two of the photosensors, and for generating and issuing a sequence of output signals that indicates the difference between, or the ratio R of, the reference table entry for a photosensor, or combination thereof, and the amount of light actually received by that photosensor, or a combination thereof, in the array;

where the light calibration means output signals are received by the computer and, in response thereto, the computer adjusts color data signals that are received by or rendered by the computer peripheral devices, to reduce the difference between the reference table entries and the corresponding output signals from the color measurement means.

16. A color calibration system for monitoring and controlling the spectrum of colors presented by one or more computer peripheral devices controlled by a computer, the system comprising:

a variable wavelength light filter having a light-receiving surface, to receive an incident light beam from the peripheral device, the light having a plurality of wavelengths in a selected wavelength band, and to disperse the beam into a plurality of four or more narrow, non-overlapping wavelength pass bands, each pass band having a wavelength width no more than 20 nm, with a central wavelength $\lambda_c(x)$ that increases monotonically with an increase of a position coordinate x measured in a selected direction lying on the light-receiving surface;

light restriction means that defines a small predetermined area for receiving and admitting light from a restricted portion of the peripheral device and for directing this light to the light-receiving surface of the light filter, where the light restriction means comprises a window that approximately coincides with the small predetermined area and has a first area transparent to light in the selected wavelength band and has a second area surrounding the first area that is substantially opaque to light in the selected wavelength band;

an array of photosensors, positioned to receive light that is transmitted through or reflected from the light filter so that each photosensor in the array receives light in a very narrow band of wavelengths having the central wavelength $\lambda_c(x)$ and having a wavelength width no more than a wavelength width of a pass band of the light filter, for light received or transmitted at the position with coordinate x on the light filter, with each photosensor in the array issuing an output signal that represents the cumulative light energy received by that photosensor from the light filter; and color measurement means for receiving the photosensor output signals and for determining the color or colors present in the incident light based on the relative amounts of light of different wavelengths received at four or more of the photosensors, wherein the color measurement means is operatively associated with a remote imaging device and associated remote imaging device light source that produces and renders a color image of the object, and the apparatus includes remote device spectrum adjustment means for compensating for the wavelength distribution of light emitted by the remote imaging device light source relative to the wavelength distribution of a selected light source.

17. The apparatus of claim 16, wherein said apparatus monitors and controls the spectrum of colors presented by first and second computer control devices, the apparatus further comprising color transformer means for receiving said calibration means output signals as input signals for each of a first and a second computer peripheral device, for transforming said calibration means output signals according to said color output signals presented by each of the first peripheral device and the second peripheral device, and for issuing the transformed signals as output signals that are received by said computer for color correction purposes.

18. The apparatus of claim 16, wherein said light received from said computer peripheral device is initially provided by a light source that illuminates an object produced by or associated with said computer peripheral device, the apparatus further comprising:

light source adjustment means, for receiving said colorimeter output signals, for computing compensated wavelength distribution of signals that compensate for the wavelength distribution of the light source relative to the wavelength distribution of a selected reference light source, and for issuing these compensated wavelength distribution signals as output signals that are received by said light calibration means.

19. The apparatus of claim 16, further comprising optical compensation means, for receiving said photosensor output signals, for storing multiplicative compensation factors for each of said photosensor output signals that compensate for non-uniformity of response of each of said photosensors with variation with wavelength of said light that is received from said light filter and for multiplying said photosensor output signals by these compensation factors.

20. The apparatus of claim 16, further comprising convolution means having a memory, for storing three color tristimulus functions $x(\lambda)$, $y(\lambda)$ and $z(\lambda)$ that depend upon a central wavelength $\lambda$ of a light beam received, for receiving said photosensor intensity signals $I(\lambda)$, where each of said photosensor intensity signals depends upon said central wavelength $\lambda = \lambda_c(x)$, and for forming and issuing tristimulus convolution integral signals X, Y and Z defined by $$X \leq \int x(\lambda) I(\lambda) d\lambda,$$

$$Y \leq \int y(\lambda) I(\lambda) d\lambda,$$

$$Z \leq \int z(\lambda) I(\lambda) d\lambda,$$

21. The apparatus of claim 20, further comprising color mapping means, for receiving said tristimulus convolution integral signals, for computing a color transformation map derived from said integral signals, and for transforming image data from a first color system having three color components to a second color system having three color components through the color transformation map.

22. The apparatus of claim 21, wherein at least one of said first and second color systems is drawn from the class of device-dependent and device-dependent color systems consisting of red/green/blue, cyan/magenta/yellow, CIE Lab, CIE YUV, CIE LUV and CIE XYZ.

23. The apparatus of claim 20, wherein said light received from said computer peripheral device is initially provided by the display screen of a monitor which emits light having an intensity that can be controllably increased and decreased by changing the value of a monitor control parameter associated with the monitor, the apparatus further comprising:
light intensity control means for controllably varying the intensity of light emitted by the monitor screen by variation of the monitor control parameter among a sequence of predetermined values of the control parameter; and
memory means for receiving and storing at least one of said photosensor signals or at least one of said convolution integral signals X, Y and Z, for at least one of the sequence of predetermined values of the control parameter.

24. The apparatus of claim 23, further comprising transfer function means for receiving said memory means contents and for determining at least one of the color gain value, the color offset value or the color gamma value from said photosensor signal or from said integral value X, Y or Z, for at least one of said sequence of predetermined values of said control parameter.

25. The apparatus of claim 16, wherein said photosensor wavelength band has a wavelength width of no greater than 1.6 nm.

26. The apparatus of claim 16, further comprising at least three color matching filters, positioned to receive said incident light before said incident light is received by said photosensor array, each color matching filter having a light wavelength passing characteristic of one of the color matching functions of the human eye.

27. A color measurement device for determining the color composition of a small predetermined area at an arbitrary position on an object having an exposed surface, the apparatus comprising:
a variable wavelength light filter having a light-receiving surface, to receive an incident light beam from the object, the light having a plurality of wavelengths in a selected wavelength band, and to disperse the beam into a plurality of narrow wavelength pass bands, with each pass band having a wavelength width of no more than 20 nm and having an central wavelength $\lambda_c(x)$ that increases monotonically with an increase of a position coordinate x measured in a selected direction lying on the light-receiving surface;
light restriction means that defines a small predetermined area for receiving and admitting light from a restricted portion of the object and for directing this light to the light-receiving surface of the light filter;
an array of photosensors, positioned to receive light that is transmitted through or reflected from the light filter so that each photosensor in the array receives light in a very narrow band of wavelengths having the central wavelength $\lambda c(x)$ and having a wavelength width no more than a wavelength width of a pass band of the light filter, for light received and dispersed at the position with coordinate x on the light filter, with each photosensor in the array issuing an output signal that represents the cumulative light energy received by that photosensor from the light filter; and
color measurement means for receiving the photosensor output signals and for determining the color or colors present in the incident light based on the relative amounts of light or different wavelengths received at four or more of the photosensors.

28. A color measurement system for monitoring and controlling the spectrum of colors presented by one or more computer peripheral devices controlled by a computer, the apparatus comprising:
a variable wavelength light filter having a light-receiving surface, to receive an incident light beam from the peripheral device, the light having a plurality of wavelengths in a selected wavelength band, and to disperse the beam into a plurality of narrow wavelength pass bands, with each pass band having a wavelength width of no more than 20 nm and having a central wavelength $\lambda_c(x)$ that increases monotonically with an increase of a position coordinate x measured into a selected direction lying on the light-receiving surface;
light restriction means that defines a small predetermined are for receiving and admitting light from a restricted portion of the object and for directing this light to the light-receiving surface of the light filter;
an array of photosensors, positioned to receive light that is transmitted through or reflected from the light filter so that each photosensor in the array receives light in a very narrow band of wavelengths, with each such band having a central wavelength $\lambda_c(x)$ and having a wavelength width no more than the wavelength width of a pass band of the light filter, for light received and dispersed at the position with coordinate x on the light filter, with each of at least seven photosensors in the array issuing an output signal that represents the cumulative light energy received by that photosensor from the light filter;
color measurement means for receiving the photosensor output signals and for determining the color or colors present in the incident light based on the relative amounts of light of different wavelengths received at seven or more of the photosensors; and
light calibration means for receiving the output signals from the photosensor array, for comparing the amount of light received by the photosensors in the array with a reference table of light values that should be received by each of the photosensors, or by a linear combination of at least two of the photosensors, and for generating and issuing a sequence of output signals that indicates the difference between, or the ratio R of, the reference table entry for a photosensor, or combination thereof, and the amount of light actually received by that photosensor, or a combination thereof, in the array;
where the light calibration means output signals are received by the computer and, in response thereto, the computer adjusts color data signals that are received by or rendered by the computer peripheral devices, to reduce the difference between the reference table entries and the corresponding output signals from the color measurement means.

* * * * *